US010536887B2

(12) United States Patent
Muthuswamy

(10) Patent No.: US 10,536,887 B2
(45) Date of Patent: Jan. 14, 2020

(54) METHOD AND SYSTEM FOR PERFORMING HANDOVER (HO) IN A LONG-RANGE LAND-TO-SEA (LRLS) WIRELESS NETWORK

(71) Applicant: Wipro Limited, Bangalore (IN)

(72) Inventor: Sridharan Muthuswamy, San Jose, CA (US)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 15/940,414

(22) Filed: Mar. 29, 2018

(65) Prior Publication Data
US 2019/0306769 A1 Oct. 3, 2019

(51) Int. Cl.
*H04W 36/08* (2009.01)
*H04W 36/30* (2009.01)
*H04B 17/336* (2015.01)

(52) U.S. Cl.
CPC ......... *H04W 36/08* (2013.01); *H04W 36/30* (2013.01); *H04B 17/336* (2015.01)

(58) Field of Classification Search
CPC ..... H04W 36/08; H04W 36/30; H04B 17/336
See application file for complete search history.

(56) References Cited

U.S. PATENT DOCUMENTS

2012/0014418 A1* 1/2012 Salim .................. H04B 7/0626
375/219
2015/0349870 A1* 12/2015 Chen .................... H04B 7/0822
375/347

OTHER PUBLICATIONS

Kumar et al., Wireless Network Performance Enhancement via Directional Antennas, CRC Press, Taylor & Francis Group, LLC, (2016).
http://www.wavonline.com/vendors/bats-wireless.aspx (last accessed Apr. 2018).

* cited by examiner

Primary Examiner — Phuc H Tran
(74) Attorney, Agent, or Firm — Pepper Hamilton LLP

(57) ABSTRACT

The present disclosure relates to a method and system for performing Handover (HO) in a Long-Range Land-To-Sea (LRLS) wireless network. The Customer-Premises Equipment (CPE) comprises an Antenna Array (AA). The HO management system scans one or more inactive AAs of CPE based on configuration parameters. Further, one of Signal to Noise Ratio (SNR) and Modulation and Coding Scheme (MCS) throughput values are retrieved on uplink and downlink. Thereafter, one of SNR and MCS throughput values on uplink and downlink are processed for determining a target AA. Further, system performs inter-network HO to Very Small Aperture Terminal (VSAT) network when cell edge is detected on target AA or inter-AA HO to target AA otherwise. Lastly, a network re-entry is initiated to target AA from the VSAT when network re-entry is detected on target AA based on processing one of the SNR or the MCS throughput values in uplink and downlink.

26 Claims, 11 Drawing Sheets

| AA configuration (number of AAs) | Primary directions |
|---|---|
| 4AA (a=1) | {0, 1, 2, 3} |
| 8AA (a=2) | {0, 2, 4, 6} |
| 16AA (a=4) | {0, 4, 8, 12} |

FIGURE 8A

| CPE AAs | AA Scan Order | Dwell Times |
|---|---|---|
| 4 | 1, 3 | Td, Td |
| 8 | 1, 7, 2, 6 | Td, Td, Td/2, Td/2 |
| 16 | 1, 15, 2, 14, 3, 13, 4, 12 | Td, Td, Td/2, Td/2, Td/4, Td/4, Td/8, Td/8 |

FIGURE 8B

| AA | ASNR | | | | | | | | | CP |
|---|---|---|---|---|---|---|---|---|---|---|
| AA0 | 44 | 43 | 38 | 49 | 43 | 36 | 41 | 43 | 49 | 37 | 20% |
| AA1 | 46 | 47 | 49 | 44 | 51 | 43 | 40 | 48 | 46 | 45 | 60% |
| AA7 | 38 | 37 | 36 | 35 | 41 | 44 | 51 | 37 | 30 | 38 | 20% |
| AA2 | 30 | 32 | 31 | 29 | 17 | 16 | 17 | 31 | 31 | 20 | 0% |
| AA6 | 19 | 33 | 17 | 14 | 32 | 40 | 16 | 21 | 22 | 32 | 0% |

FIGURE 8C

| SS1 | 0  | 1  | 2  | 3  | 4  | 5  | 6  | 7  |
|-----|----|----|----|----|----|----|----|----|
| SS2 | 8  | 9  | 10 | 11 | 12 | 13 | 14 | 15 |
| SS3 | 16 | 17 | 18 | 19 | 20 | 21 | 22 | 23 |
| SS4 | 24 | 25 | 26 | 27 | 28 | 29 | 30 | 31 |

FIGURE 8D

| SS1 | 4.4  | 8.5  | 12.1 | 16.0 | 24.0 | 29.9 | 33.3 | 35.9 |
|-----|------|------|------|------|------|------|------|------|
| SS2 | 8.4  | 16.1 | 23.3 | 30.8 | 43.5 | 55.3 | 59.1 | 62.2 |
| SS3 | 12.4 | 24.3 | 35.3 | 44.8 | 61.5 | 71.2 | 74.2 | 76.5 |
| SS4 | 16.2 | 31.4 | 44.7 | 57.8 | 71.0 | 78.9 | 80.6 | 80.6 |

FIGURE 8E

| AA  | MCS (Throughput) | | | | | CP |
|-----|-----------|-----------|-----------|-----------|-----------|-----|
| AA0 | 4 (24.0)  | 3 (16.0)  | 5 (29.9)  | 11 (30.8) | 11 (30.8) | 40% |
| AA1 | 24 (16.2) | 5 (29.9)  | 11 (30.8) | 11 (30.8) | 10 (23.3) | 20% |
| AA7 | 25 (31.4) | 25 (31.4) | 18 (35.3) | 17 (24.3) | 11 (30.8) | 80% |

FIGURE 8F

| Target AA | AWSNR | | | | | CP |
|---|---|---|---|---|---|---|
| downlink | 6 | 8 | 11 | 5 | 5 | 60% |
| Uplink | 9 | 8 | 5 | 9 | 9 | 20% |

FIGURE 8G

| Target AA | MCS (Throughput) | | | | | CP |
|---|---|---|---|---|---|---|
| downlink | 0 (4.4) | 8 (8.4) | 1 (8.5) | 0 (4.4) | 0 (4.4) | 60% |
| uplink | 1 (8.5) | 8 (8.4) | 8 (8.4) | 0 (4.4) | 1 (8.5) | 20% |

FIGURE 8H

| AA | AWSNR | | | | | CP |
|---|---|---|---|---|---|---|
| "w" (downlink) | 27 | 28 | 20 | 31 | 28 | 80% |
| "w" (uplink) | 31 | 38 | 29 | 28 | 31 | 100% |

FIGURE 8I

| AA | MCS (Throughput) | | | | | CP |
|---|---|---|---|---|---|---|
| "w" (downlink) | 17 (24.3) | 18 (35.3) | 10 (23.3) | 11 (30.8) | 18 (35.3) | 80% |
| "w" (uplink) | 11 (30.8) | 18 (35.3) | 19 (44.8) | 18 (35.3) | 11 (30.8) | 100% |

FIGURE 8J

METHOD AND SYSTEM FOR PERFORMING HANDOVER (HO) IN A LONG-RANGE LAND-TO-SEA (LRLS) WIRELESS NETWORK

FIELD

The present subject matter is related, in general, to a long range wireless communication, and more particularly, but not exclusively, to a method and system for performing Handover (HO) in a Long-Range Land-to-Sea (LRLS) wireless network.

BACKGROUND

In a long-range land-to-sea (LRLS) communication using variable-time-slot-TDMA (VTS-TDMA) a Base Transceiver Station (BTS) is deployed on land and Customer Premises Equipment (CPE) is deployed out in the sea (on a ship). The CPE uses an Antenna Array (AA) to communicate with the BTS. An active AA among the AAs, with optimum signal link strength and in Line of Sight (LOS) with the BTS is used for communicating with the BTS. Mobility of ships may lead to change in the active AA. Narrow band spatial interference, persistent noise spikes, deep fading of signal on the active AA may require switching of the active AA to a neighboring AA. In the existing systems, the CPE scans every non-active AA for determining a new active AA. Further, tracking the BTS AA by a CPE AA with 4AAs, is the only solution provided by the existing systems. BTS handover may also trigger switching of the active AA. Tracking of BTS AA by switching the CPE active AA under the above-mentioned circumstances is essential to maintain the LRLS communication link between the BTS and the CPE and to sustain Service Level Agreement (SLA) or improve the Quality of Service (QoS). The SLA is a contract between a service provider (either internal or external) and an end user that defines the level of service expected from the service provider.

Intermittent tracking of the BTS AA, results in maintenance issue of SLA (service quality) at the CPE if data throughput drops below the SLA or if the LRLS connection times out and link drops. In such a scenario, there is a need to switch data-path to Very Small Aperture Terminal (VSAT) network to maintain SLA. A network re-entry to the LRLS network re-entry may trigger data-path switch back to LRLS network (from VSAT), thereby, switching back and forth of data-paths, between LRLS and VSAT channels occurs. The switching back and forth results in a "flapping" (ping-pong) effect. The flapping effect affects overall Quality of Experience (QoE). Since the LRLS operates in a shared spectrum, the channel quality becomes unpredictable as it also depends on usage of the shared spectrum by other entities. This further aggravates the flapping effect post switching of channel from VSAT to LRLS under unfavorable conditions of the LRLS channel.

Few of the existing systems use electro-mechanical means to move and aim the CPE antenna in the distant BTS direction for establishing a wireless network link with the BTS. Further, the existing systems monitor signal strength and network performance to incrementally reposition the CPE antenna to optimize throughput. Few other existing systems use Long Range Directional Wake up Radios (LD-WuR) static and dynamic antenna strategies (signal processing techniques) to beam steer and identify BTS antenna direction avoiding the need for electro-mechanical steering of CPE antenna to track the BTS direction. The limitation occurs as the existing systems use motors to rotate the CPE antenna in all directions. Usage of heavier equipment (including stabilizing platforms) results in requirement of large amount of space onboard, use of additional signal processing and/or RF circuitry to track BTS antenna direction.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure relates to a method for performing Handover (HO) in a Long-Range Land-To-Sea (LRLS) wireless network. The method comprises receiving, by a HO management system of a Customer Premise Equipment (CPE), one or more configuration parameters from the CPE. The CPE comprises an active AA communicating with a Base Transceiver Station (BTS) and one or more inactive AAs. Further, the method comprises retrieving based on data traffic between the CPE and the BTS, at least one of, Signal to Noise Ratio (SNR) values on uplink and downlink corresponding to the active AA and at least one adjacent neighbor AA of the active AA. The SNR values are retrieved by scanning at least one adjacent neighbor AA of the active AA based on the configuration parameters and Modulation and Coding Scheme (MCS) throughput values on the uplink and the downlink corresponding to the active AA and immediate neighbor AA pair of the active AA, wherein the MCS values are retrieved by dwelling on each of the immediate neighbor AA pair of the active AA. Further, the method comprises determining a target AA based on one of the SNR values and the MCS throughput values on the uplink and the downlink. Lastly, the method comprises initiating a HO from active AA to the determined target AA, for performing an inter-AA HO.

In an embodiment, the present disclosure relates to a Handover (HO) management system of a Customer Premise Equipment (CPE) for performing HO in a Long-Range Land-To-Sea (LRLS) wireless network. The HO management system comprises a processor and a memory, communicatively coupled with the processor, storing processor executable instructions, which, on execution causes the processor to receive one or more configuration parameters from the CPE. The CPE comprises an active AA communicating with a Base Transceiver Station (BTS) and one or more inactive AAs. Further, the processor is configured to retrieve based on data traffic between the CPE and the BTS, at least one of, Signal to Noise Ratio (SNR) values on uplink and downlink corresponding to the active AA and at least one adjacent neighbor AA of the active AA. The SNR values are retrieved by scanning at least one adjacent neighbor AA of the active AA based on the configuration parameters, and Modulation and Coding Scheme (MCS) throughput values on the uplink and the downlink corresponding to the active AA and immediate neighbor AA pair of the active AA. The MCS values are retrieved by dwelling on each of the immediate neighbor AA pair of the active AA. Furthermore, the processor is configured to determine a target AA based on one of the SNR values and the MCS throughput values on the uplink and the downlink. Lastly, the processor is configured to initiate a HO from active AA to the determined target AA, for performing an inter-AA HO.

In another embodiment, the present disclosure relates to a method for performing Handover (HO) in a Long-Range Land-To-Sea (LRLS) wireless network. The method comprises retrieving one of SNR values and MCS throughput values on uplink and downlink corresponding to a target AA based on data traffic between a Customer Premise Equipment (CPE) and a Base Transceiver Station (BTS). The SNR values retrieved on the uplink and the downlink are stored in the SNR uplink and downlink circular buffers respectively. Each of the SNR values are subjected to weighting to obtain corresponding Aggregate Weighted SNR (AWSNR) values. The MCS throughput values retrieved on the uplink and the downlink are stored in MCS uplink and downlink circular buffers respectively. Further, the method comprises identifying one of AWSNR values less than a third threshold value on the SNR uplink and downlink circular buffers respectively and MCS throughput values less than a fourth threshold value on the MCS uplink and downlink circular buffers respectively. Furthermore, the method comprises determining one of a confidence percentage for the uplink and the downlink based on the identification of the AWSNR values. The confidence percentage is a percentage ratio of number of AWSNR values identified and total number of AWSNR values in the SNR uplink and downlink circular buffers respectively and a confidence percentage for the uplink and the downlink based on the identification of the MCS throughput values. The confidence percentage is a percentage ratio of number of MCS throughput values identified and total number of MCS throughput values in the MCS uplink and downlink circular buffers respectively. Lastly, the method comprises performing HO to Very Small Aperture Terminal (VSAT) network from the target AA, when the confidence percentage of one of the uplink and the downlink determined based on the AWSNR values and the MCS throughput values is greater than a fifth threshold value and sixth threshold value respectively.

In an embodiment, the present disclosure relates to a Handover (HO) management system of a Customer Premise Equipment (CPE) for performing HO in a Long-Range Land-To-Sea (LRLS) wireless network, the HO management system comprising a processor and a memory, communicatively coupled with the processor, storing processor executable instructions, which, on execution causes the processor to retrieve one of SNR values and MCS throughput values on uplink and downlink corresponding to a target AA based on data traffic between a Customer Premise Equipment (CPE) and a Base Transceiver Station (BTS). The SNR values retrieved on the uplink and the downlink are stored in the SNR uplink and downlink circular buffers respectively. Each of the SNR values are subjected to weighting to obtain corresponding Aggregate Weighted SNR (AWSNR) values. The MCS throughput values retrieved on the uplink and the downlink are stored in MCS uplink and downlink circular buffers respectively. Further, the processor is configured to identify one of AWSNR values less than a third threshold value on the SNR uplink and downlink circular buffers respectively and MCS throughput values less than a fourth threshold value on the MCS uplink and downlink circular buffers respectively. Furthermore, the processor is configured to determine one of a confidence percentage for the uplink and the downlink based on the identification of the AWSNR values. The confidence percentage is a percentage ratio of number of AWSNR values identified and total number of AWSNR values in the SNR uplink and downlink circular buffers respectively and a confidence percentage for the uplink and the downlink based on the identification of the MCS throughput values. The confidence percentage is a percentage ratio of number of MCS throughput values identified and total number of MCS throughput values in the MCS uplink and downlink circular buffers respectively. Lastly, the processor is configured to perform HO to Very Small Aperture Terminal (VSAT) network from the target AA, when the confidence percentage of one of the uplink and the downlink determined based on the AWSNR values and the MCS throughput values is greater than a fifth threshold value and sixth threshold value respectively.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

FIG. 8A illustrates positions of the primary directions for a forward-facing ship for each of the AA configuration, in accordance with some embodiments of the present disclosure-FIG. 8J;

FIG. 8B illustrates scan order and the dwell time for each AA, in accordance with some embodiments of the present disclosure;

FIG. 8C illustrates ASNR values retrieved for AA0, AA1, AA7, AA2 and AA6 on the downlink, in accordance with some embodiments of the present disclosure;

FIG. 8D illustrates the maximum throughout (in Mbps) supported by each of the MCSs, in accordance with some embodiments of the present disclosure;

FIG. 8E illustrates MCS throughput values retrieved for AA0, AA1 and AA7 on the downlink and stored in respective MCS downlink circular buffers, in accordance with some embodiments of the present disclosure;

FIG. 8F illustrates the AWSNR values stored in the SNR uplink circular buffers and the SNR downlink circular buffer corresponding to the target AA, in accordance with some embodiments of the present disclosure;

FIG. 8G illustrates the MCS throughput values stored in the MCS uplink circular buffers and the MCS downlink circular buffer corresponding to the target AA, in accordance with some embodiments of the present disclosure;

FIG. 8H illustrates the AWSNR values stored in the SNR uplink circular buffer and the SNR downlink circular buffer corresponding to the new target AA, in accordance with some embodiments of the present disclosure;

FIG. 8I illustrates the MCS throughput values stored in the MCS uplink circular buffer and the MCS downlink circular buffer corresponding to the new target AA, in accordance with some embodiments of the present disclosure; and FIG. 8J illustrates the MCS throughput values stored in the MCS uplink circular buffer and the MCS downlink circular buffer corresponding to the new target AA, in accordance with some embodiments of the present disclosure.

Figure 1:
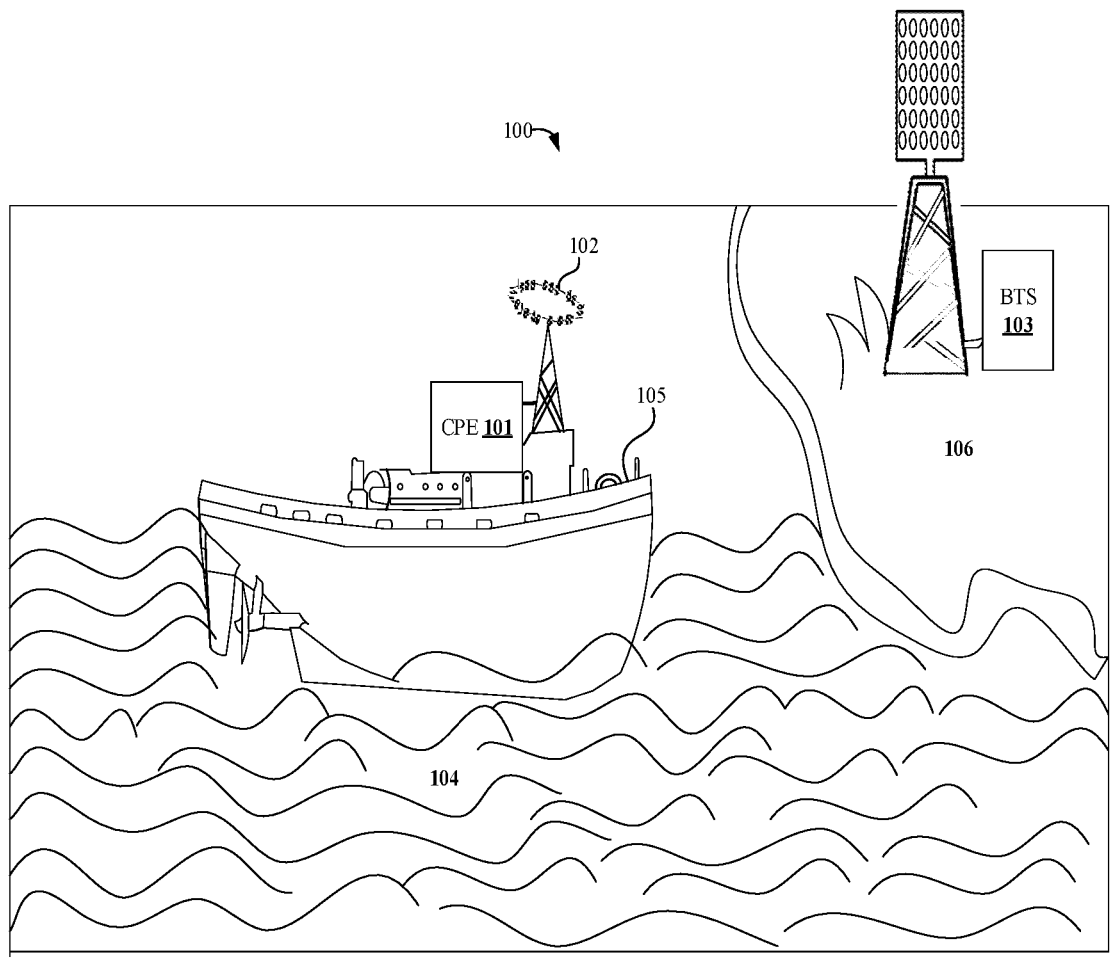
FIG. 1 shows an exemplary environment illustrative of Long-Range Land-To-Sea (LRLS) Wireless network for performing Handover (HO) in the LRLS network, in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

Embodiments of the present disclosure relate to a method and system for performing Handover (HO) in a Long-Range Land-To-Sea (LRLS) wireless network. The handover management system receives configuration parameters from a Customer-Premises Equipment (CPE). The CPE comprises an active Antenna Array (AA) communicating with the Base Transceiver Station (BTS) and one or more inactive AAs. The system scans the one or more inactive AAs based on the configuration parameters. Further, one of SNR values and Modulation and Coding Scheme (MCS) throughput values are retrieved on uplink and downlink. Thereafter, the SNR values and MCS throughput values on the uplink and the downlink are processed for determining a target AA. Furthermore, a HO is initiated to the target AA from the active AA. Further, the system performs inter-network HO to Very Small Aperture Terminal (VSAT) network or inter-AA HO to target AA from active AA, based on detection of cell edge on the target AA. Furthermore, the system determines a new target AA and performs a network re-entry to the LRLS network from the VSAT network if the new target AA satisfies the conditions of network re-entry.

FIG. 1 shows an exemplary environment illustrative of Long-Range Land-To-Sea (LRLS) Wireless network for performing Handover (HO) in the LRLS network, in accordance with some embodiments of the present disclosure. The environment 100 comprises a water body 104, a watercraft 105, land 106, and a Base Transceiver Station (BTS) 103 deployed on the land 106. The water body 104 may be a sea or an ocean and the land 106, for example, may include coastal areas or islands. The watercraft 105 may be referred as a ship 105. The ship 105 navigating in the water body 104 may be in communication with the BTS 103 deployed on the land 106. It may be apparent to a person skilled in the art that the watercraft 105, for example, may include, but is not limited to a boat, a submarine, a hovercraft, and a seaplane. The ship 101 comprises a Customer Premises Equipment (CPE) referred as CPE 101 or a mobile station to establish communication with the BTS 103. In other words, in order to provide communication service within the ship 105, the CPE 101 installed on the ship 105 establishes communication with a BTS 103. The CPE 101 comprises plurality of Antenna Arrays (AAs) 103. The plurality of AAs 103 comprises an active AA and one or more inactive AAs. The active AA actively communicates with the BTS 103 and has an optimum signal link strength with the BTS 103. The communication may be established using a LRLS wireless communication link using Variable-Time-Slot-TDMA (VTS-TDMA) in the 5 Gigahertz (GHz) unlicensed shared spectrum. The active AA is in Line of Sight (LoS) with the BTS 103. The one or more inactive AAs are neighbors of the active AA. In an embodiment the active AA and the one or more inactive AAs are adjacent to each other, thereby, forming a closed loop.

In an embodiment, the CPE 101 may comprise the one or more AAs 103 in a specific configuration like four AAs, eight AAs and sixteen AAs. Each of the one or more AAs comprises four antenna elements and together form a high gain directional antenna for LRLS communication. In another embodiment, the BTS 103 may have two AAs, one AA serving in port and the other AA pointing out in the sea. The CPE 101 may further comprise various signal processing units for processing of signals radiated to and from the one or more AAs 103.

In another embodiment, there may be one or more BTS deployed on the land 106 and there may also be one or more ships navigating in the water body 104 having a communication link with a corresponding BTS.

Figure 2:
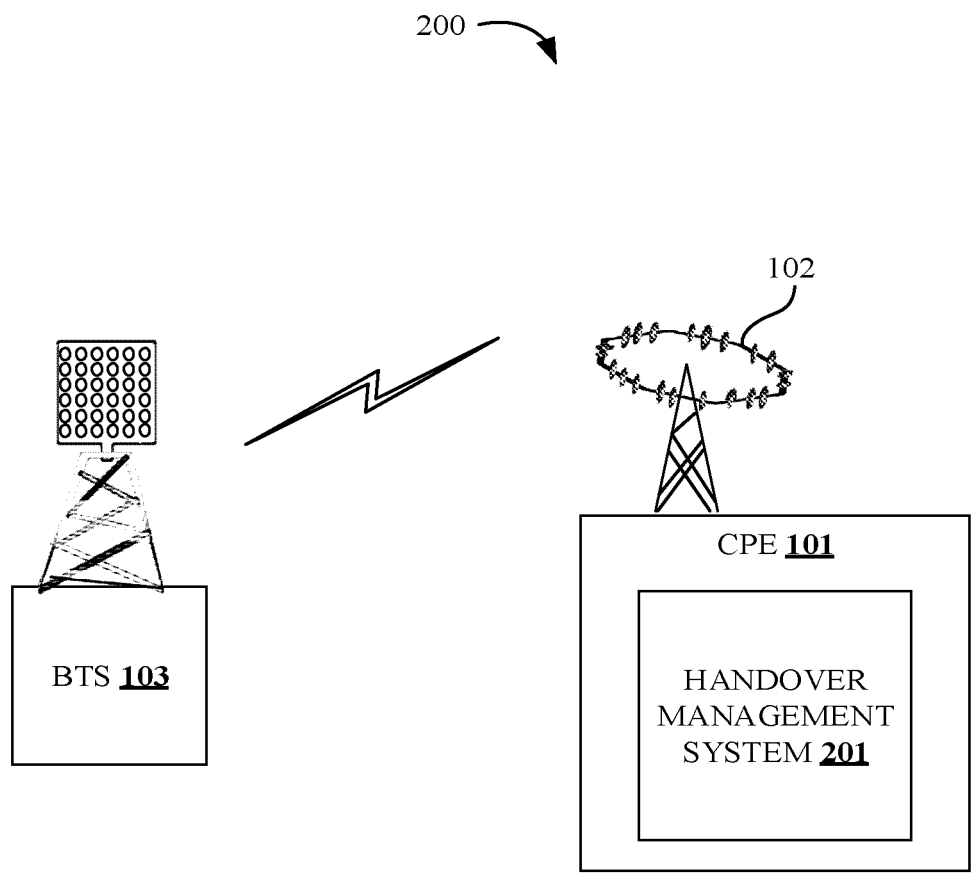
FIG. 2 shows a block diagram illustrative of an exemplary environment for performing Handover (HO) in a LRLS network, in accordance with some embodiments of the present disclosure

FIG. 2 shows a block diagram illustrative of an exemplary environment 200 for performing Handover (HO) in a LRLS network in accordance with some embodiments of the present disclosure. The environment 200 comprises the BTS 103, the CPE 101 and the one or more AAs 102 associated with the CPE 101. The CPE 101 further comprises a Handover (HO) management system 201. The HO management system 201 performs HO in the LRLS network. The HO may be one of inter-AA HO and inter-network HO. The inter-AA HO is a HO occurring between two AAs of the CPE 101. The inter-AA occurs when the signal quality received at the active AA is less than that of a neighboring AA, thereby, resulting in suboptimal throughput performance with the BTS 103. This may be because the active AA has moved away from the LoS of the BTS 103 (due to the movement of the ship (as illustrated in FIG. 1)) or due to presence of an obstacle between the active AA and the BTS 103 blocking the LoS of the BTS 103 or deep channel fading phenomenon or noise spikes, or narrow band interference seen on the active communication link. The HO management system 201 scans the one or more inactive AAs based on the configuration parameters periodically. The HO management system 201 retrieves one of SNR values, and Modulation and Coding Scheme (MCS) throughput values, for each of the one or more AAs 102 on uplink and downlink based on data traffic between the CPE 101 and the BTS 103. The uplink may be termed as a link which carries data or as a link for transmission of signals from the CPE 101 to the BTS 103. The downlink may be termed as a link which carries data or as a link for transmission of signals from the BTS 103 to the CPE 101. Further the HO management system 201 processes one of the SNR values and the MCS throughput values corresponding to each of the one or more AAs 102 based on one or more threshold values for determining a target AA. Based on the processing the HO management system 201 initiates HO to the target AA from the active AA. Therefore, the HO management system 201 maintains an optimum signal link strength between the CPE 101 and the BTS 103 by the performing the inter-AA handover.

In an embodiment, before performing the HO, the HO management system 201 re-ensures that the determined target AA may be essentially used for establishing an optimum and secure communication link between the BTS 103 and the CPE 101. The HO management system 201 runs the target AA through a cell edge detection logic. The cell edge detection logic detects if the target AA is well within the LoS of the BTS 103 and is not in a verge of moving away from the LoS of the BTS 103. The cell edge detecting logic may be performed by collection and processing of one of the SNR values and the MCS throughput values on the uplink and downlink corresponding to the target AA. Based on the processing, if the cell edge is not detected on the uplink and the downlink, the HO management system 201 performs the inter-AA HO to the target AA from the active AA. Based on the processing, if the cell edge is detected on either of the uplink or the downlink, the HO management system 201 initiates and performs HO to a Very Small Aperture Terminal (VSAT) network (satellite network) by disabling data-path. Therefore, the HO management system 201 performs the inter-network HO from the LRLS network to the VSAT network. In a view of maximizing usage of the LRLS network, the HO management system 201 determines a new target AA or uses the determined target AA and examines if a network re-entry could be performed to the LRLS network. The network re-entry may be determined by collection and processing of one of the SNR values and the MCS throughput values on the uplink and downlink corresponding to the target AA. Based on the processing, if the network re-entry is possible on both the uplink and the downlink, the HO management system 201 initiates HO from the VSAT network to the LRLS network by enabling the data-path.

In an implementation, the HO management system 201 may be configured as a stand-alone connected to the CPE 101. The HO management system 201 may be connected to the CPE 101 by a wired means. In another embodiment, the CPE 101 communicates with the BTS 103 over a wireless network. The CPE 101 and the BTS 103 may be configured to employ connection protocols including, without limitation, IEEE 802.11a/b/g/n/x, Long Term Evolution (LTE), LTE-advanced, WiMAX and the like. The BTS 103 and the CPE 101 may wirelessly communicate employing the standards of the connection protocols.

Figure 3:
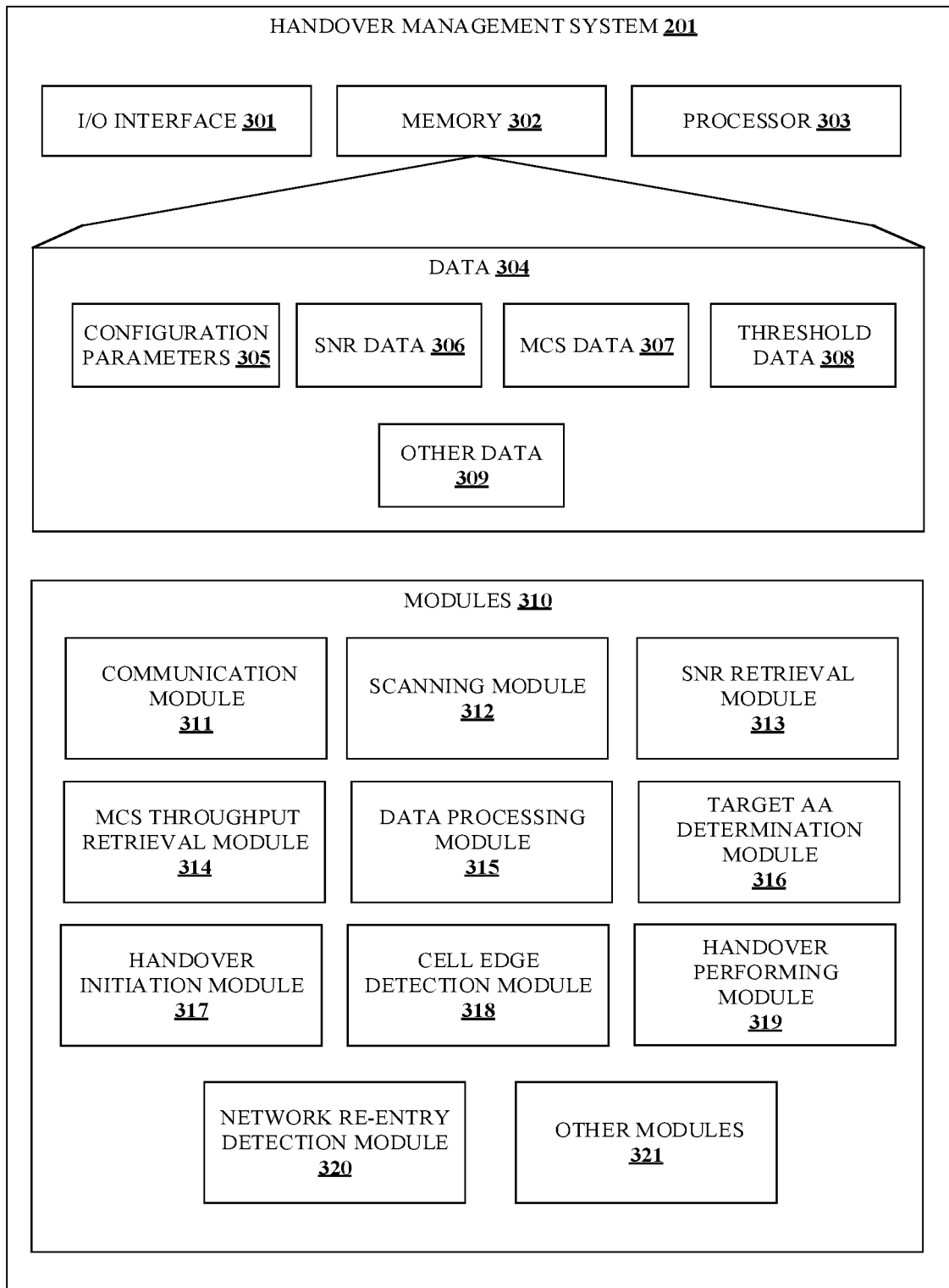
FIG. 3 shows an exemplary block diagram of a handover management system for performing Handover (HO) in a LRLS network, in accordance with some embodiments of the present disclosure.

FIG. 3 shows an exemplary block diagram of a handover management system for performing Handover (HO) in a LRLS network, in accordance with some embodiments of the present disclosure. The HO management system 201 may include at least one processor 303 and a memory 302 storing instructions executable by the at least one processor 303. The processor 303 may comprise at least one data processor for executing program components for executing user or system-generated requests. The memory 302 is communicatively coupled to the processor 303. The HO management system 201 further comprises an Input/Output (I/O) interface 301. The I/O interface 301 is coupled with the processor 303 through which an input signal or/and an output signal is communicated. In an embodiment, the I/O interface 301 receives the configuration parameters from the CPE 101.

In an embodiment, data 304 may be stored within the memory 302. The data 304 may include, for example, configuration parameters 305, SNR data 306, MCS data 307, threshold data 308 and other data 309.

In an embodiment, the configuration parameters 305 may refer to a list of parameters required for determining of the target AA. The list of parameters may include, but are not limited to, AA periodic scan interval for retrieval of SNR values (TSS), AA periodic scan interval for retrieval of MCS throughput values (TSF), AA dwell time for retrieval of SNR values (TDS), AA dwell time for retrieval of MCS throughput values (TDF), SNR expiry time (TSNR), and MCS expiry time (TMCS) and the like. The AA periodic scan interval for retrieval of SNR values (TSS) may refer to a periodic interval in which the CPE performs inspection of the one or more inactive AAs for retrieval of SNR values. The CPE 101 may periodically signal the BTS 103 every TSS, intending to scan the one or more inactive AAs for retrieval of SNR values. The AA periodic scan interval for retrieval of MCS throughput values (TSF) may refer to a periodic interval in which the CPE performs inspection of immediate neighbor pair AA of the active AA for retrieval of MCS throughput values. The AA dwell time for retrieval of SNR values (TDS) may refer to time spent on scanning an adjacent neighbor of the active AA for retrieval of SNR values. The TDS value for each of the adjacent neighbor of the active AA may vary. The AA dwell time for retrieval of MCS throughput values (TDF) may refer to a time consumed by the CPE 101 in dwelling on each of the immediate neighbor pair AA of the active AA for retrieval of MCS throughput values. The SNR expiry time (TSNR) refers to a time interval, after the lapse of which the SNR values stored in a SNR uplink circular buffers and a SNR downlink circular buffers are purged out. The MCS expiry time (TMCS) refers to a time interval, after the lapse of which the MCS throughput values stored in a MCS uplink circular buffers and a MCS downlink circular buffers are purged out.

In an embodiment, the SNR data 306 comprises the SNR values retrieved on the uplink and the downlink corresponding to the active AA and at least one adjacent neighbor of the active AA. The SNR values retrieved on the uplink are stored in the SNR uplink circular buffers. The SNR values retrieved on the downlink are stored in the SNR downlink circular buffers. Each AA of the one or more AAs 102 is associated with the SNR uplink circular buffers and the SNR downlink circular buffers. The SNR uplink circular buffers and the SNR downlink circular buffers may be of a pre-defined size.

In an embodiment, the MCS data 307 comprises the MCS throughput values retrieved on the uplink and the downlink corresponding to the active AA and the immediate neighbor AA pair of the active AA. The MCS throughput values retrieved on the uplink are stored in the MCS uplink circular buffers. The MCS throughput values retrieved on the downlink are stored in the MCS downlink circular buffers. Each AA of the one or more AAs 102 is associated with the MCS uplink circular buffer and the MCS downlink circular buffers.

In an embodiment, the threshold data 308 may refer to one or more threshold values used for processing the SNR values and the MCS throughput values for determining the target AA and for performing HO. The one or more threshold values may include, but are not limited to, a first threshold value, a second threshold value, a third threshold value, a fourth threshold value, a fifth threshold value and a sixth threshold value. The first threshold value may refer to a confidence percentage threshold used for determining the target AA when SNR values are retrieved. A confidence percentage is determined for the active AA and the at least one adjacent neighbor of the active AA during processing of the SNR values. The confidence percentage is determined on the uplink and the downlink and is compared with the first threshold value. The second threshold value refers to a confidence percentage threshold used for determining the target AA when MCS throughput values are retrieved. A confidence percentage is determined for the active AA and the immediate neighbor AA pair of the active AA during processing of the MCS throughput values. The confidence percentage is determined on the uplink and the downlink and is compared with the second threshold value.

In an embodiment the other data 309 may include, but is not limited to, status of current active AA, status of inter-AA HO, and inter-network HO. Status of the current active AA may indicate if the current active AA is connected to the BTS 103 and the duration for which the current active AA is actively communicating with the BTS 103. Status of inter-AA HO and inter-network HO may indicate if the inter-AA handover is in progress or if the inter-network is in progress.

In an embodiment, the data 304 in the memory 302 is processed by modules 310 of the HO management system 201. As used herein, the term module refers to an Application Specific Integrated Circuit (ASIC), an electronic circuit, a Field-Programmable Gate Arrays (FPGA), Programmable System-on-Chip (PSoC), a combinational logic circuit, and/or other suitable components that provide the described functionality. The modules 310 when configured with the functionality defined in the present disclosure will result in a novel hardware.

In one implementation, the modules 310 may include, for example, a communication module 311, a scanning module 312, a SNR retrieval module 313, a MCS throughput retrieval module 314, a data processing module 315, a target AA determination module 316, a HO initiation module 317, a cell edge detection module 318, a, a handover performing module 319, network re-entry detection module 320 and other modules 321. It will be appreciated that such aforementioned modules 310 may be represented as a single module or a combination of different modules.

In an embodiment, the communication module 311 facilitates communication between the HO management system 201 and the CPE 101 and the plurality of antennas 102. For example, the communication module 311 may receive data packets or signals directed to the CPE 101 and may further provide the data packets or signals to the plurality of antennas associated with the CPE 101 for transmission. In an embodiment, the communication module 311 may help in communication between the CPE 101 and the BTS 103.

In an embodiment, the scanning module 312 facilitates scanning of the one or more inactive AAs during the scan interval. The scanning module 312 scans the one or more inactive AAs based on a pre-defined scan order. Based on data traffic between the CPE 101 and the BTS 103, the scanning module 312 facilitates scanning of the one or more inactive AAs. In an embodiment, the data traffic between the CPE 101 and the BTS 103 is said to be high when the throughput between the CPE 101 and the BTS 103 is greater than a high throughput threshold value (HTth) of 15 Mbps. HTth may be in a range of 15 Mbps to 45 Mbps. In another embodiment, the data traffic between the CPE 101 and the BTS 103 is said to be low when the throughput between the CPE 101 and the BTS 103 is lower than a low throughput threshold value (LTth) of 5 Mbps. The LTth may be in range of 0 Mbps to 15 Mbps. If the data traffic is high, the fast acquisition mode is enabled, and slow acquisition mode is disabled. If the data traffic is low, slow acquisition mode is enabled and fast acquisition mode is disabled. The hysteresis between the two thresholds HTth and LTth (15−5=10 Mbps) dampens the back and forth switch of modes.

Figure 3A:
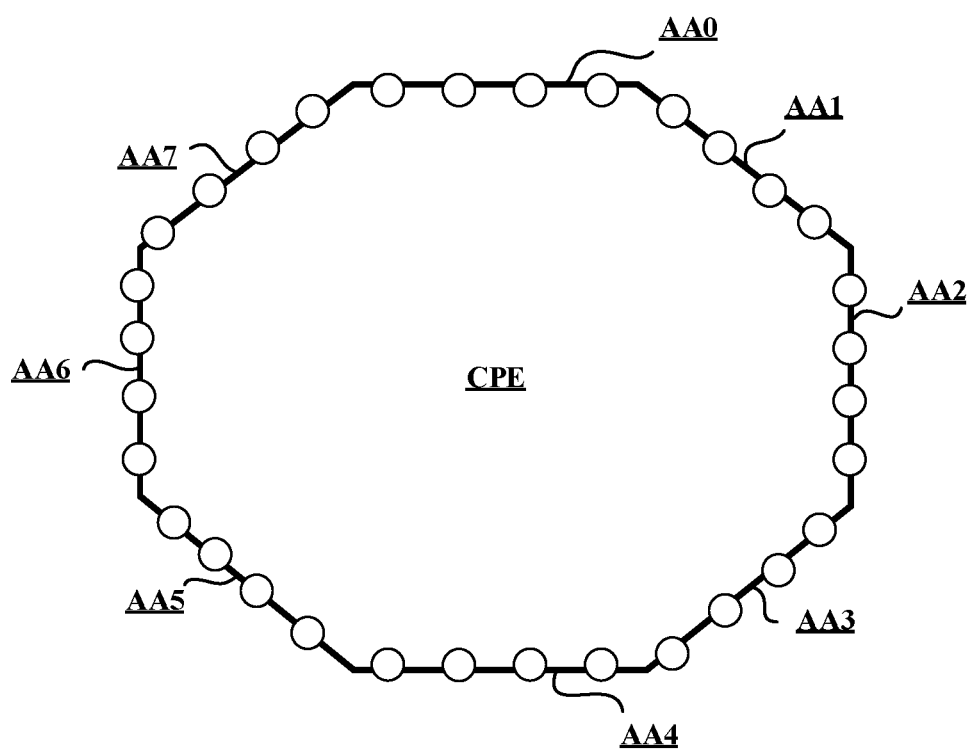
FIG. 3a indicates an example illustrating the AAs of the CPE in accordance with some embodiments of the present disclosure.

In an embodiment, when a high data traffic is experienced on the LRLS wireless network between the BTS 103 and the CPE 101, the scanning module 312 scans only the immediate neighbor AA pair of the active AA for retrieval of MCS throughput values. FIG. 3a indicates an example illustrating the AAs of the CPE in accordance with some embodiments of the present disclosure. FIG. 3a indicates a CPE with eight AAs comprising AA0, AA1, AA2, AA3, AA4, AA5, AA6 and AA7. AA0 is considered as the active AA. Consider a first instance, for a CPE associated with N AAs, with 0th AA being the active AA. The immediate neighbor AA may be determined as N1=(N+1) mod(N) and N2=(N−1) mod (N). Referring to FIG. 3a, AA1 and AA7 would be the immediate neighbor AAs for AA0. The scanning module 312 would therefore scan only AA1 and AA7. In another embodiment, when a low to moderate data traffic is experienced on the LRLS wireless network between the BTS 103 and the CPE 101, the scanning module 312 scans at least one adjacent neighbor AA of the active AA. Considering the first instance, the first adjacent neighbor AA pair of the active AA may be determined as N1=(N+1) mod(N) and N2=(N−1) mod (N) followed by a second neighbor AA pair as N3=(N+2) mod N and N4=(N−2) mod N and so on. Referring to FIG. 3a, AA 1 and AA 7 would be the first adjacent neighbor AA pair for AA0 and AA2 and AA6 would be the second adjacent neighbor AA pair for AA0. Therefore, the scanning module 312 scans AA1, AA2, AA7 and AA6 only. In an embodiment, for the first instance the scanning module 312 may consider only N/4 adjacent neighbor AA on either side of the active AA for scanning. The order of scanning is predefined for each configuration of AAs. Periodicity of scanning is received from the configuration parameters 305. During every scan interval the scanning module 312 instructs the CPE 101 to signal the BTS 103. The CPE 101 signals the BTS 103 by sending out a Time Division Duplex (TDD) frame. The TDD frame comprises a flag. The flag is tristate. The flag with value of "1" indicates SNR collection mode, the flag with a value of "2" indicates 'don't care mode' and the flag with a value of "0" indicates end of scan mode. In an embodiment, the scanning by the scanning module 312 is carried out only during retrieval of SNR values.

In an embodiment, the SNR retrieval module 313 retrieves the SNR values corresponding to the active AA and at least one adjacent neighbor AA of the active AA on the uplink and the downlink. Retrieval of SNR values may be referred to as the slow acquisition mode. The slow acquisition mode occurs when low to moderate data traffic is experienced on the LRLS wireless network between the BTS 103 and the CPE 101. In the slow acquisition mode, the target AA is determined based on the retrieved SNR values. Once the CPE 101 and the BTS 103 enter the scanning mode, the CPE 101 and the BTS 103 alternately send a sequence of stats frame on the uplink and the downlink. Each of the stats frame facilitate the CPE 101 in computing the corresponding SNR values on the uplink and the downlink. Further, the SNR retrieval module 313 stores the SNR values retrieved on the uplink and the downlink in the SNR uplink circular buffers and the SNR downlink circular buffers respectively.

In an embodiment, the MCS throughput retrieval module 314 retrieves the MCS throughput values on the uplink and the downlink corresponding to the active AA and the immediate neighbor AA pair of the active AA. Retrieval of MCS throughput values may be referred as the fast acquisition mode. The fast acquisition mode occurs when high data traffic is experienced on the LRLS wireless network between the BTS 103 and the CPE 101. In the fast acquisition mode, the target AA is determined based on the retrieved MCS throughput values. The MCS throughput retrieval module 314 retrieves the MCS throughput values by dwelling on each of the immediate neighbor AA pair of the active AA for a period of TDF. The TDF may be in the order of milliseconds. The MCS throughput retrieval module 314 switches from the active AA to one immediate neighbor AA, retrieves the MCS throughput values corresponding to the one immediate neighbor AA of the active AA and switches back to the active AA. Similarly, the MCS throughput retrieval module 314 switches from the active AA to another immediate neighbor AA of the active AA, retrieves the MCS throughput values corresponding to another immediate neighbor AA of the active AA and switches back to the active AA. MCS throughput values on the uplink and the downlink may be retrieved by link adaptation. Further, the MCS throughput retrieval module 314 stores the MCS throughput values retrieved on the uplink and the downlink in the MCS uplink circular buffers and the MCS throughput values downlink circular buffers respectively.

In an embodiment, the data processing module 315, processes one of the SNR values and the MCS throughput values. The SNR values stored in the SNR uplink circular buffers and the SNR downlink circular buffers are provided as input to the data processing module 315 during the slow acquisition mode. Similarly, the MCS throughput values stored in the MCS uplink circular buffers and the MCS downlink circular buffers are provided as input to the data processing module 315 during the fast acquisition mode. The data processing module 315 processes the SNR values in the SNR uplink circular buffers and the SNR downlink circular buffers by determining a confidence percentage for each of the at least one adjacent neighbor AA of the active AA and the active AA. The confidence percentage indicates a percentage of high SNR values obtained for the active AA and each of the at least one adjacent neighbor of the active AA. Further, the data processing module 315 compares the confidence percentage of each of the at least one adjacent neighbor AA of the active AA and the active AA with a first threshold value. Similarly, the data processing module 315 processes the MCS throughput values in the MCS uplink circular buffer and the MCS downlink circular buffers by determining confidence percentage for each of the immediate neighbor AA pair of the active AA and the active AA based on the MCS uplink circular buffers and the MCS downlink circular buffers. The confidence percentage indicates a percentage of high MCS throughput values obtained for each of the immediate neighbor AA pair of the active AA and the active AA. Further, the data processing module 315 compares the confidence percentage of each of the immediate neighbor AA pair of the active AA and the active AA with a second threshold value.

In an embodiment, the target AA determination module 316 determines the target AA. In the slow acquisition mode, the target AA determination module 316 determines the target AA based on the processing of the SNR values in the SNR uplink circular buffers and the SNR downlink circular buffers. The AA having the highest confidence percentage greater than the first threshold value on both the uplink and the downlink is unanimously chosen as the target AA. In the fast acquisition mode, the target AA determination module 316 determines the target AA based on the processing of the MCS throughput values in the MCS uplink circular buffers and the MCS downlink circular buffers. The AA having the highest confidence percentage greater than the second threshold value on both the uplink and the downlink is unanimously chosen as the target AA.

In an embodiment, the handover initiation module 317 initiates HO. The handover initiation module 317 may initiate the inter-AA HO or the inter-network HO. Once the target AA determination module 316 determines the target AA, the handover initiation module 317 initiates the inter-AA HO to the target AA.

In an embodiment, the cell edge detection module 318 detects cell edge in the target AA. Before performing the inter-AA HO to the determined target AA, the cell edge detection module 318 re-ensures that the determined target AA may be essentially used for establishing an optimum and secure communication link between the BTS 103 and the CPE 101. The HO management system 201 runs the target AA through the cell edge detection logic. The cell edge detection logic detects if the target AA is well within the LoS of the BTS 103 and is not in a verge of moving away from the LoS of the BTS 103. The cell edge detection may be performed by collection and processing of one of the SNR values and the MCS throughput values on the uplink and downlink corresponding to the target AA. Based on the processing of one of the SNR values and the MCS throughput values the cell edge detection module 318 indicates if the cell edge is detected on the target AA.

In an embodiment, the handover performing module 319 performs HO. The handover performed may be one of inter-AA HO and inter-network HO. If the cell edge detection module 318 does not detect a cell edge on the target AA, the handover performing module 319 performs the inter-AA HO from the active AA to the target AA. If the cell edge is detected by the cell edge detection module 318 on either the uplink or the downlink, the handover performing module 319 performs HO to the VSAT network (satellite network) from the active AA of the LRLS network, by disabling data-path.

In an embodiment, the network re-entry detection module 320 detects if the network re-entry could be performed. In order to maximize the usage of the LRLS network, the network re-entry detection module 320 detects possibility of the network re-entry to the LRLS network after the inter-network HO has been performed to the VSAT network. After HO has been performed to the VSAT network the target AA determination module 316 may determine the new target AA or may use the determined target AA. Further the network re-entry detection module 320 examines if the network re-entry could be performed to the LRLS network through the new target AA. The network re-entry detection module 320 detects if the network re-entry may be performed by collection and processing of one of the SNR values and the MCS throughput values on the uplink and downlink corresponding to the new target AA. Based on the processing of one of the SNR values and the MCS throughput values, if the network re-entry is possible on both the uplink and the downlink, the Handover performing module 319 performs HO from the VSAT network to the new target AA of the LRLS network by enabling the data-path.

In an embodiment, the other modules 321 may include, but are not limited to, an age-out metrics module. The age-out metrics module purges out the stored SNR and MCS throughput values based on the configuration parameters. In an embodiment, the age-out metrics module purges out the SNR values in the SNR uplink and downlink circular buffers after a period of TSNR.

Figure 4:
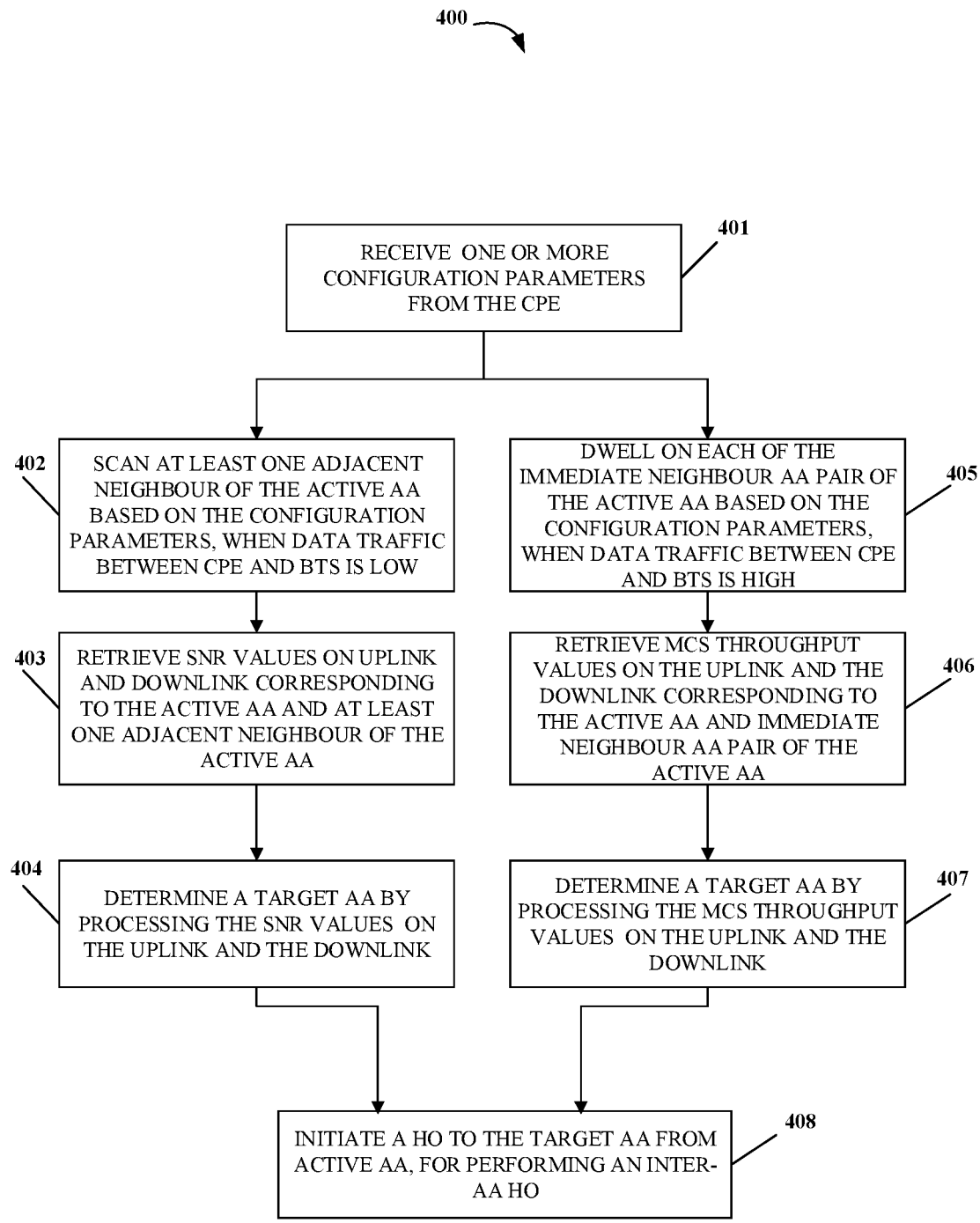
FIG. 4 shows an exemplary flow chart illustrating method steps for initiating inter-AA HO in a LRLS network, in accordance with some embodiments of the present disclosure.
Figure 5:
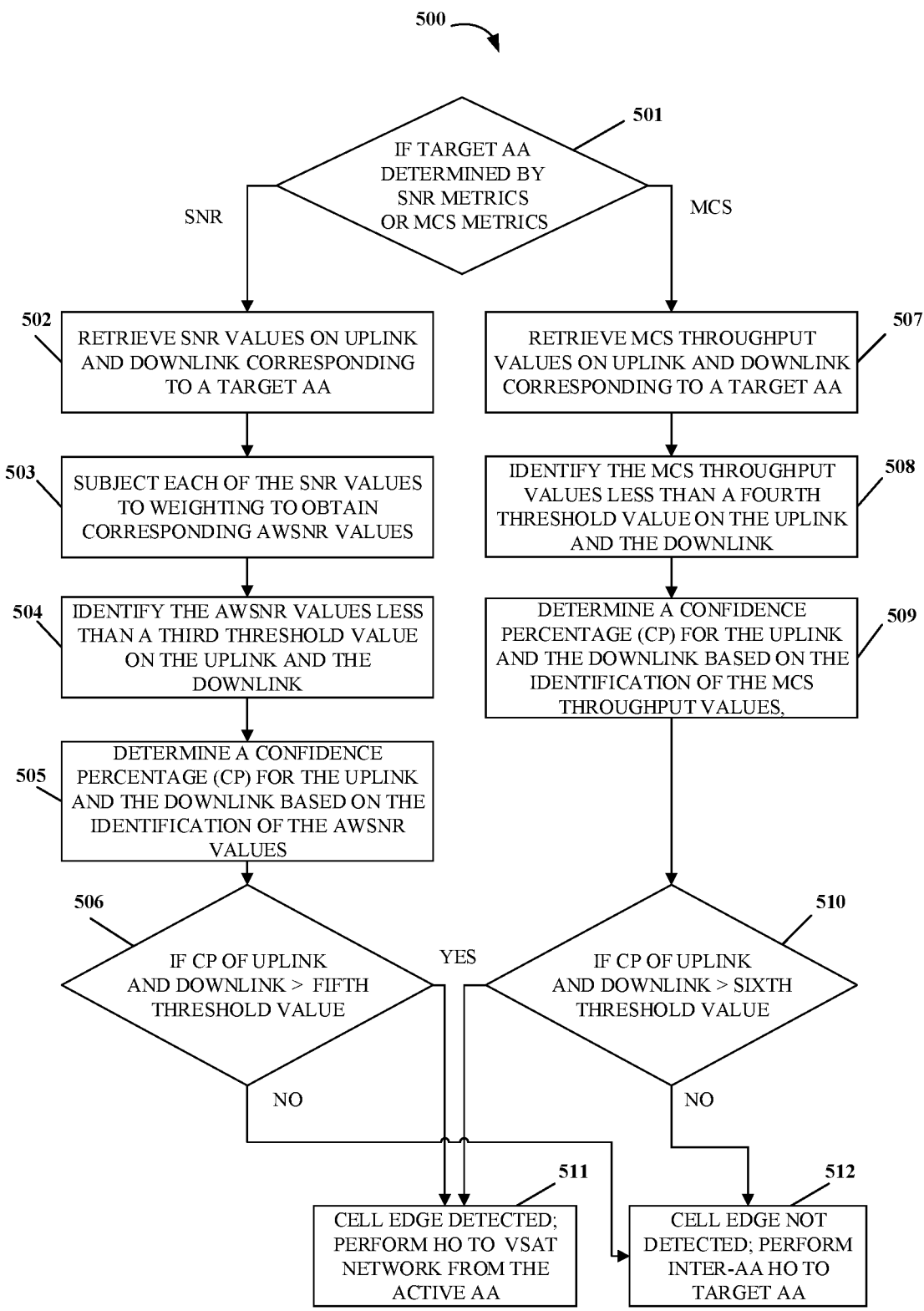
FIG. 5 shows an exemplary flow chart illustrating method steps for detecting cell edge on a target AA in a LRLS network, in accordance with some embodiments of the present disclosure.
Figure 6:
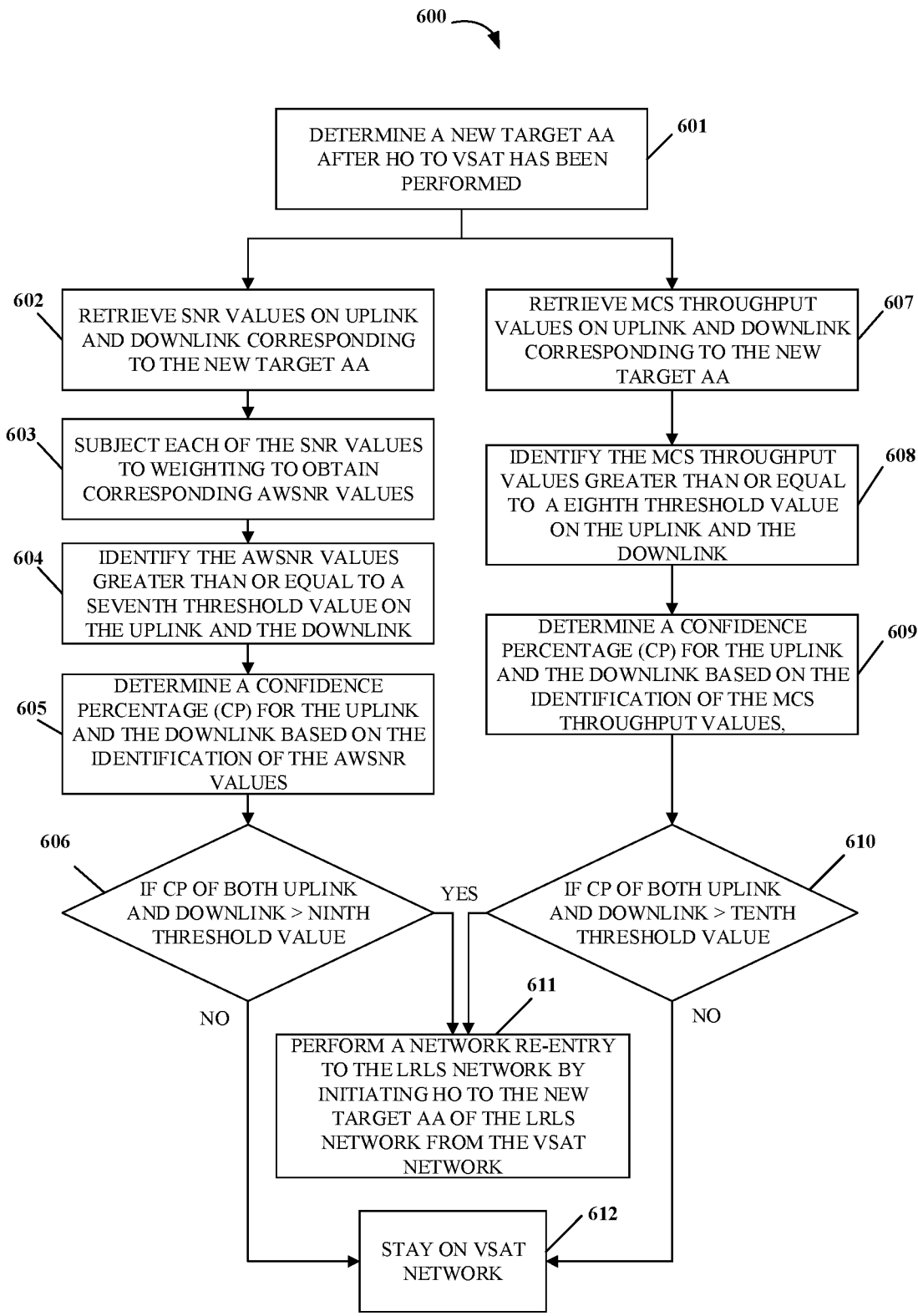
FIG. 6 shows an exemplary flow chart illustrating method steps for performing network re-entry to a LRLS network, in accordance with some embodiments of the present disclosure.

FIG. 4 shows an exemplary flow chart illustrating method steps 400 for performing inter-AA HO in the LRLS network, in accordance with some embodiments of the present disclosure;

As illustrated in FIG. 4, FIG. 5 and FIG. 6 the method 400, method 500 and method 600 respectively may comprise one or more blocks for migrating applications into cloud platforms. The method 400, method 500 and method 600 may be described in the general context of computer executable instructions. Generally, computer executable instructions may include routines, programs, objects, components, data structures, procedures, modules, and functions, which perform particular functions or implement particular abstract data types.

The order in which the method 400, method 500 and method 600 is described is not intended to be construed as a limitation, and any number of the described method blocks may be combined in any order to implement the method. Additionally, individual blocks may be deleted from the methods without departing from the scope of the subject matter described herein. Furthermore, the method may be implemented in any suitable hardware, software, firmware, or combination thereof.

At step 401, the communication module 311 may receive the configuration parameters 305 from the CPE 101. In an embodiment, the configuration parameters may include, but are not limited to, AA periodic scan interval for retrieval of SNR values (TSS), AA periodic scan interval for retrieval of MCS throughput values (TSF), AA dwell time for retrieval of SNR values (TDS), AA dwell time for retrieval of MCS throughput values (TDF), SNR expiry time (TSNR), and MCS expiry time (TMCS) and the like.

Figure 7:
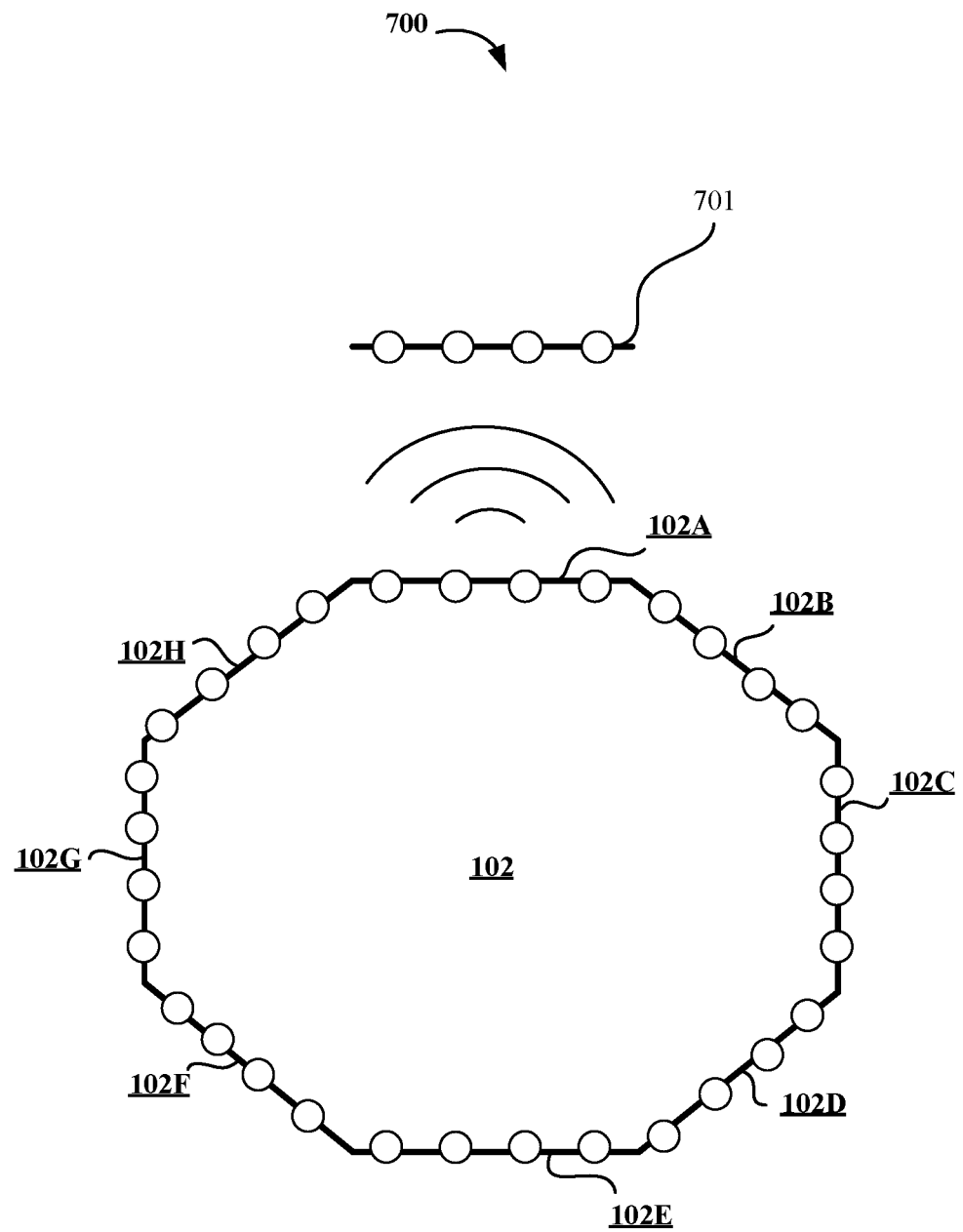
FIG. 7 indicates an example illustrating communication between CPE AAs and BTS AA, in accordance with some embodiments of the present disclosure.

FIG. 7 indicates an environment 700 illustrative of communication between CPE AAs and BTS AA, in accordance with some embodiments of the present disclosure. The environment 700 comprises the plurality of AAs 102 of the CPE 101 and a BTS AA 701. As illustrated in FIG. 7, the CPE 101 comprises eight AAs 102 referred as AA 102A, AA 102B, AA 102H. The eight AAs 102 are placed in the form of an octagon where each edge of the octagon is an AA. Each of the eight AAs 102 comprises 4 antenna elements as illustrated. The AA 102A is the active AA and currently in LoS with the BTS AA 701 and is actively communicating with the BTS AA 701. The AA 102A, AA 102B, ..., AA 102H may be referred as AA0, AA1, ..., AA7 hereafter in the present disclosure. AAs of the CPE 101 may be numerically enumerated such that the active AA is always AA0, with other AA enumerations increasing in arithmetic progression (clock-wise). Ships have four primary directions fore (front), starboard (right), aft (rear), port (left), and when facing forward and positions of the primary directions for a forward-facing ship for each of the AA configuration is derived using equation 1:

$$f(i)=a*i, \text{ where } i=\{0,1,2,3\} \quad (1)$$

FIG. 8A indicates positions of the primary directions for a forward-facing ship for each of the AA configuration and is derived using equation 1.

In an embodiment, the scanning module 312 inspects each AA of the CPE 101 based on the data traffic between the CPE 101 and the BTS 103. During the slow acquisition mode, the scanning module 312 inspects at least one adjacent neighbor AA of the active AA with a periodicity of TSS. During the fast acquisition mode, the scanning module 312 inspects only the immediate neighbor AA pair of the active AA with a periodicity of TSF. The scan intervals TSS and TSF may be in the order of seconds. Referring to FIG. 7, consider if the ship 105 is moving in a clockwise direction, the eight AAs 102 would also move in the clockwise direction. Therefore, the current active AA AA0 may set forth the LoS of the BTS AA 701 and the probable AA to come in phase with the BTS AA 701 are AA7 and AA6 (as the ship may not rotate in a very fast manner and may take several minutes for rotating in comparison to the scan interval (TSS and TSF) which are in the order of seconds). Similarly, if the ship 105 is moving in an anti-clockwise direction, the eight AAs 102 would also move in the anti-clockwise direction. Therefore, the current active AA AA0 may set forth the LoS of the BTS AA 701 and the probable AA to come in phase with the BTS AA 701 are AA1 and AA2. Therefore, the scanning module 312 may not indulge in scanning the far neighbor AAs (AA3, AA4 and AA5) of the active AA in the slow acquisition mode.

In an embodiment, the step 402 to step 404 are performed during the slow acquisition mode when low to moderate data traffic is experienced on the LRLS wireless network between the BTS 103 and the CPE 101.

At step 402, the scanning module 312 instructs the CPE 101 to signal the BTS during the beginning of every scan interval TSS. The CPE 101 signals the BTS 103 by sending out a Time Division Duplex (TDD) frame with the flag set to "1", indicating an intent of the CPE 101 to scan the at least one adjacent neighbor AA of the active AA. Referring to FIG. 7, the scanning module 312 scans N/4 (8/4=2) AAs on either side of the AA0 (active AA). Therefore, the neighbor AAs considered for scanning by the scanning module 312 are AA1, AA7, AA2 and AA6. The scanning module 312 scans and dwells on each neighbor AAs for a period as indicated by equation 2

$$TDS = TDS/2^{\hat{}}(j) \qquad (2)$$

Where, j={0, 1, 2, 3 ...}

A first neighbor AA pair for the AA0 are AA1 and AA7. For the first neighbor AA pair j=0. Therefore, the scanning module 312 would scan and dwell on AA1 and AA7 individually for a dwell time of TDS (as per equation 2). The TDS may be in the order of milliseconds. Similarly, a second neighbor AA pair for AA0 are AA2 and AA6. For the second neighbor AA pair j=1. Therefore, the scanning module 312 would scan and dwell on AA2 and AA6 individually for a dwell time of TDS/2 (as per equation 2). The neighbor AAs are scanned in a pre-defined scan order. The scan order and the dwell time for each AA is illustrated in FIG. 8B for different AA configurations.

As illustrated in FIG. 8B, the dwell time progressively decreases exponentially for far neighbor AAs. After signaling the BTS 103 for scanning, the CPE 101 shuts the data-path in the uplink and the downlink. Further upon receiving the TDD frame with a flag set to "1", the BTS 103 interprets that the CPE 101 has entered the scanning mode and further the BTS 103 shuts its data-path in the uplink and the downlink.

At step 403, the SNR retrieval module 313 retrieves the SNR values on the uplink and the downlink corresponding to the active AA and the at least one adjacent neighbor of the active AA. Upon receiving the TDD frame from the CPE 101, the BTS 103 immediately switches to a stats frame mechanism to enable CPE 101 to retrieve the SNR values. The CPE 101 dwells on the AA1, during which the BTS 103 and the CPE 101 alternately send a sequence of stats frames with an inter-sequence spacing ISS and sequence duration Te. Each of the stats frames will have the SNR value in the frame header. The alternate between the BTS 103 and the CPE 101 happens in a way that there are integer number of transmit pairs (Np) in a given dwell time TDS. That is, (2Te+ISS) Np<TDS<10 where the maximum variable frame time in the uplink or downlink is 10 ms. The stats frames are link level Media Access Control (MAC) Protocol Data Units (PDUs) and are best effort frames (no retransmission). Similarly, the CPE retrieves the SNR values on the uplink and the downlink corresponding to AA7, AA2 and AA6 and also AA0 (active AA). Further, the SNR retrieval module 313 stores the SNR values retrieved on the uplink and the downlink corresponding to each AA in the SNR uplink circular buffers and the SNR downlink circular buffers respectively. Each of the SNR uplink circular buffers and the SNR downlink circular buffers are of a predefined size M.

At step 404, the data processing module 315 processes the SNR values in the SNR uplink circular buffers and the SNR downlink circular buffers by determining a Confidence Percentage (CP) for each of the at least one adjacent neighbor AA of the active AA and the active AA. The CP indicates a percentage of high SNR values obtained for the active AA and each of the at least one adjacent neighbor of the active AA. Further, the data processing module 315 compares the confidence percentage of each of the at least one adjacent neighbor AA of the active AA and the active AA with a first threshold value.

In an embodiment, an example of SNR metric processing is indicated with reference to FIG. 7. The FIG. 8C below indicates ASNR values retrieved for AA0, AA1, AA7, AA2 and AA6 on the downlink. The size of the SNR downlink circular buffer is M=10. Each AA has 4 antenna elements. The SNR samples across the four antenna elements are aggregated to generate an Aggregated SNR (ASNR) value for a given AA at a given instance.

The data processing module 315, determines the highest ASNR value in each column (highlighted) of SNR downlink circular buffers. Further, the data processing module 315 determines the number of highest ASNR values in each SNR downlink circular buffer and computes CP. For instance, AA0 has two high ASNR values out of 10 ASNR value. Therefore, the CP for AA0 is (2/10)*100=20%. Similarly, the data processing module 315 determines CP for each of the AA as illustrated in the FIG. 8C. Further, the data processing module 315 determines if the CP of the AA is greater than a first threshold value. The first threshold value may refer to a CP threshold used for determining the target AA when SNR values are retrieved. The first threshold value is set as 50%. From FIG. 8C it is ascertained that the highest CP is for AA1 and this value is greater than the first threshold. 60% of the ASNR values on AA1 are greater than the confidence percentage threshold for target AA selection (first threshold of 50%). Clearly AA1 is the target AA on the downlink. Similar processing is done for uplink ASNR values to determine the target AA. The target AA is unanimously elected when both uplink and downlink declare the same target AA1.

In an embodiment, the step 405 to step 407 are performed during the fast acquisition mode (retrieval of MCS values) when high data traffic is experienced on the LRLS wireless network between the BTS 103 and the CPE 101.

At step 405 and 406, the MCS throughput retrieval module 314 dwells on only the immediate neighbor AA of the active AA. In an embodiment, far neighbor AA are not dwelled on in the fast acquisition mode. The MCS throughput retrieval module 314 dwells for a period of TDF on each of the immediate neighbor AA of the active AA. The MCS throughput retrieval module 314 switches from the active AA to one immediate neighbor AA, retrieves the MCS throughput values corresponding to the one immediate neighbor AA of the active AA and switches back to the active AA. Similarly, the MCS throughput retrieval module 314 switches from the active AA to another immediate neighbor AA of the active AA, retrieves the MCS throughput values corresponding to another immediate neighbor AA of the active AA and switches back to the active AA. MCS throughput values on the uplink and the downlink may be retrieved from the link adaptation (MCS ramp up and ramp down). The link adaptation adapts the Modulation and Coding Scheme (MCS) according to the quality and parameters of the radio channel like the ARQ retransmission rate and throughput. The process of link adaptation is dynamic, and the signal and protocol parameters change as the radio link conditions change. Therefore, the MCS throughput values are easily retrieved based on the MCS and link adaptation on the uplink and the downlink. Referring to FIG. 7, the MCS throughput retrieval module 314 dwells on AA1 and AA7 only (AA0 is the active AA) for retrieval of MCS throughput values. The MCS throughput retrieval module 314 stores the MCS throughput values retrieved on the uplink and downlink in the MCS uplink circular buffer and the MCS downlink circular buffer respectively. Each AA has four antenna elements and each antenna element corresponds to a Spatial Stream (SS). Therefore, each AA may have four SS. Spatial streams refer to transmission of independent and separately encoded data signals called streams, from each of the multiple transmit antennas. The link adaptation on each SS adapts to determine a MCS mode (throughput) supported by the AA. Modulation and coding schemes (MCS) are used to determine the data rate (throughput) of a wireless connection using high-throughput Orthogonal Frequency Division Multiplexing (HT-OFDM).

32 MCSs are present with each of the MCSs are defined to support a fixed value of throughput. FIG. 8D below indicates the MCSs supported by each SS.

As indicated in FIG 8D, SS1 supports MCS 0 to MCS 7. SS2 supports MCS 8 to MCS 15, SS3 supports MCS 16 to MCS 23 and SS4 supports MCS 24 to MCS 31.

FIG. 8E below indicates the maximum throughput (in Mbps) supported by each of the MCSs. The values in FIG. 8E are determined experimentally.

As illustrated in FIG. 8E, the maximum throughput supported on a channel using MCS 0 is 4.4 Mbps. Similarly, the maximum throughput supported on a channel using MCS 30 is 80.6 Mbps. The link adaptation on each channel dynamically determines the throughput supported on the channel.

At step 407, the data processing module 315 processes the MCS throughput values in the MCS uplink circular buffers and the MCS downlink circular buffers by determining confidence percentage for each of the immediate neighbor AA pair of the active AA and the active AA based on the MCS uplink circular buffers and the MCS downlink circular buffers. The confidence percentage indicates a percentage of high MCS throughput values obtained for each of the immediate neighbor AA pair of the active AA and the active AA. Further, the data processing module 315 compares the confidence percentage of each of the immediate neighbor AA pair of the active AA and the active AA with a second threshold value.

In an embodiment, an example of MCS throughput values processing is explained with reference to FIG. 7. The FIG. 8F below indicates MCS throughput values retrieved for AA0, AA1 and AA7 on the downlink and stored in respective MCS downlink circular buffers. The size of the MCS downlink circular buffer is M=5. The second threshold value is set to 65%. The second threshold value refers to a confidence percentage threshold used for determining the target AA when MCS throughput values are retrieved.

As illustrated in FIG. 8F the link adaptation determines the MCSs supported on AA1 on the downlink as MCS 24, MCS 5, MCS 11, MCS 11 and MCS 10 during the dwell time of AA1 and stores the MCSs with the corresponding throughput values in the respective MCS downlink circular buffer. The corresponding throughput values for each of the MCS are indicate in brackets.

The data processing module 315, determines the highest MCS throughput values in each column (highlighted) of the MCS downlink circular buffers. Further, the data processing module 315 determines the number of highest MCS throughput values in each SNR downlink circular buffer and computes CP. For instance, AA7 has four high MCS throughput values out of 5 MCS throughput values. Therefore, the CP for AA7 is (4/5)*100=80%. Similarly, the data processing module 315 determines CP for each of the AA as illustrated in the FIG. 8F. Further, the data processing module 315 determines if the highest CP of the AA is greater than a second threshold value. The second threshold value may refer to a CP threshold used for determining the target AA when MCS throughput values are retrieved. The first threshold value is set as 65%. From FIG. 8F it is ascertained that AA7 has the highest CP which is greater than the first threshold. 80% of the MCS throughput values on AA7 are greater than the CP threshold for target AA selection second threshold=65%. Clearly AA7 is the target AA. Similar processing is done for uplink MCS throughput values to determine the target AA. The target is unanimously elected when both uplink and downlink declare the same target AA7.

In an embodiment, if the current active AA is determined to be the target AA on both the uplink and the downlink, the active AA may be retained for communicating with the BTS 103.

At step 408, the handover initiation module 317 initiates a HO to the target AA. Upon determination of the target AA by the target AA determination module 316, the handover initiation module 317 initiates the inter-AA HO to the target AA.

FIG. 5 shows an exemplary flow chart illustrating method steps for detecting cell edge on a target AA in a LRLS network, in accordance with some embodiments of the present disclosure;

At step 501, the cell edge detection module 318 determines if the target AA is determined using the SNR metrics (slow acquisition mode) or MCS metrics (fast acquisition mode).

In an embodiment steps 502 through steps 506 and step 511, step 512 indicates cell edge detection based on SNR metrics. The steps 502 to 506 are executed if the target AA is determined using the SNR metrics.

At step 502, the SNR retrieval module 313 retrieves SNR values on the uplink and the downlink corresponding to the target AA using the method disclosed in step 404.

At step 503, the SNR retrieval module 313 subjects each of the SNR values retrieved to weighting to obtain the corresponding Aggregate Weighted SNR (AWSNR) values and stores the AWSNR values of the uplink and the downlink in the SNR uplink circular buffer and the SNR downlink circular buffer respectively.

At step 504, the data processing module 315 identifies the AWSNR values less than the third threshold value on the SNR uplink circular buffers and the SNR downlink circular buffer. The third threshold value may refer to a AWSNR data-path disable threshold and indicates the value of AWSNR present on the uplink and the downlink which could sustain the SLA requirement.

At step 505, the data processing module 315 determines CP for the SNR uplink circular buffers and the SNR downlink circular buffers. The CP is a percentage ratio of number of AWSNR values identified in the step 504 and total number of AWSNR values in the SNR circular buffers respectively.

At step 506, the cell edge detection module 318 compares the CP of the uplink and the downlink with the fifth threshold value. The fifth threshold value may refer to the CP for performing one of inter-AA HO and inter-network HO.

At step 511, if the CP of one of the uplink and the downlink is greater than the fifth threshold value, the cell edge detection module 318 detects a cell edge on the target AA and hence the Handover performing module 319 performs inter-network HO to VSAT network from the LRLS network by disabling the data-path and the link may be marked as connected, active and data-path disabled.

At step 512, if the CP of the uplink and the downlink is lesser than the fifth threshold value, the cell edge detection module 318 does not detect a cell edge on the target AA and hence the Handover performing module 319 performs inter-AA HO to the target AA from the active AA.

In an embodiment, FIG. 8G below indicates the AWSNR values stored in the SNR uplink circular buffers and the SNR downlink circular buffer corresponding to the target AA. The third threshold is set to 7 and the fifth threshold value is set to 50%.

As illustrated in FIG. 8G, the AWSNR values less than the third threshold value of 7 is determined in the SNR uplink circular buffers and the SNR downlink circular buffer, by the data processing module 315. Further, the data processing module 315 determines the CP for the uplink and the downlink. CP for uplink and downlink is the percentage ratio of number of AWSNR values less than the third threshold and total number of AWSNR values in the respective SNR uplink and downlink circular buffers. For an instance, in the SNR downlink circular buffer three out of five AWSNR values are less than the third threshold value. Therefore, the CP for the downlink is calculated as (3/5)*100=60%. Similarly, the CP for uplink is determined as 20%. The cell edge detection module 318 compares the CP of the uplink and the downlink with the fifth threshold value. In the downlink, 60% of AWSNR values are less than the third threshold value. The CP is greater than the confidence percentage for data-path disable (fifth threshold) and cell edge is detected on the SNR downlink circular buffer. In the uplink, only 20% of AWSNR values are less than the AWSNR data-path disable threshold (third threshold). Further the CP for uplink is less than the confidence percentage for data-path disable (fifth threshold) and cell edge is not detected on the SNR uplink circular buffer. As the cell edge is detected on one of the uplink and the downlink, the Handover performing module 319 perform the inter-network HO to the VSAT network from the LRLS network.

In an embodiment steps 507 through steps 510 and step 511, step 512 indicates cell edge detection based on MCS metrics. The steps 507 to 510 are executed if the target AA is determined using the MCS metrics.

At step 507, the MCS throughput retrieval module 314 retrieves MCS throughput values on the uplink and the downlink corresponding to the target AA using the method disclosed in step 407. Further, the MCS throughput retrieval module 314 stores the MCS throughput values of the uplink and the downlink in the MCS uplink circular buffer and the MCS downlink circular buffer respectively.

At step 508, the data processing module 315 identifies the MCS throughput values less than the fourth threshold value on the MCS uplink circular buffer and the MCS downlink circular buffer. The fourth threshold value may refer to the MCS throughput data-path disable threshold and indicates the MCS throughput in the uplink and downlink required to sustain the SLA.

At step 509, the data processing module 315 determines CP for the MCS uplink circular buffers and the MCS downlink circular buffers. The CP for uplink and downlink is a percentage ratio of number of MCS throughput values identified in the step 508 and total number of MCS throughput values in the MCS uplink circular buffers and the MCS downlink circular buffers respectively.

At step 510, the cell edge detection module 318 compares the CP of the uplink and the downlink with the sixth threshold value. The sixth threshold value may refer to the CP for performing one of inter-AA HO and inter-network HO.

At step 511, if the CP of one of the uplink and the downlink is greater than the sixth threshold value, the cell edge detection module 318 detects a cell edge on the target AA and hence the Handover performing module 319 performs inter-network HO to VSAT network from the LRLS network by disabling the data-path and the link may be marked as connected, active and data-path disabled.

At step 512, if the CP of the uplink and the downlink is lesser than the sixth threshold value, the cell edge detection module 318 does not detect a cell edge on the target AA and hence the Handover performing module 319 performs inter-AA HO to the target AA from the active AA.

In an embodiment, FIG. 8H below indicates the MCS throughput values stored in the MCS uplink circular buffers and the MCS downlink circular buffer corresponding to the target AA. The fourth threshold value is set to 5 Mbps and the sixth threshold value is set to 50%.

As illustrated in FIG. 8H, the MCS throughput values less than the third threshold value of 5 Mbps is determined in the MCS uplink circular buffers and the MCS downlink circular buffer, by the data processing module 315. Further, the data processing module 315 determines the CP for the uplink and the downlink. CP for uplink and downlink is the percentage ratio of number of MCS throughput values less than the fourth threshold and total number of MCS throughput values in the MCS uplink circular buffers and the MCS downlink circular buffers respectively. For an instance, in the MCS downlink circular buffer three out of five MCS throughput values are less than the fourth threshold value. Therefore, the CP for the downlink is calculated as (3/5)*100=60%. Similarly, the CP for uplink is determined as 20%. The cell edge detection module 318 compares the CP of the uplink and the downlink with the sixth threshold value. In the downlink, 60% of MCS throughput values are less than the fourth threshold value. The CP is greater than the confidence percentage for data-path disable (sixth threshold) and cell edge is detected on the MCS downlink circular buffer. In the uplink, only 20% of MCS throughput values are less than the MCS data-path disable threshold (fourth threshold). Further the CP for uplink is less than the confidence percentage for data-path disable (sixth threshold) and cell edge is not detected on the MCS uplink circular buffer. As the cell edge is detected on one of the uplink and the downlink, the Handover performing module 319 performs the inter-network HO to the VSAT network from the LRLS network.

FIG. 6 shows an exemplary flow chart illustrating method steps 600 for performing network re-entry to a LRLS network, in accordance with some embodiments of the present disclosure.

At step 601, a new target AA is determined after the inter-network HO to VSAT has been performed. The new target AA may be determined based on the method steps 400. Further the network re-entry may be performed based on one of SNR metrics and MCS metrics.

In an embodiment steps 602 through steps 606 and step 611, step 612 indicates network re-entry mechanism based on SNR metrics. The steps 602 to 606 are executed if the new target AA is determined using the SNR metrics.

At step 602, the SNR retrieval module 313 retrieves SNR values on the uplink and the downlink corresponding to the new target AA using the method disclosed in step 404.

At step 603, the SNR retrieval module 313 subjects each of the retrieved SNR values to weighting to obtain the corresponding AWSNR values and stores the AWSNR values of the uplink and the downlink in the SNR uplink circular buffer and the SNR downlink circular buffer respectively.

At step 604, the data processing module 315 identifies the AWSNR values greater than or equal to the seventh threshold value on the SNR uplink circular buffer and the SNR downlink circular buffer. The seventh threshold value may refer to a AWSNR data-path enable threshold. The seventh threshold value indicates the AWSNR which sustains a throughput of at least 20 Mbps greater than the SLA requirement.

At step 605, the data processing module 315 determines CP for the SNR uplink circular buffer and the SNR downlink circular buffer. The CP is a percentage ratio of number of AWSNR values identified in the step 604 and total number of AWSNR values in the SNR uplink and downlink circular respectively.

At step 606, the cell edge detection module 318 compares the CP of the uplink and the downlink with the ninth threshold value. The ninth threshold value may refer to the CP for performing network re-entry to LRLS network.

At step 611, if the CP of both of the uplink and the downlink is greater than the ninth threshold value, the network re-entry detection module 320 detects possible network re-entry. Therefore, the network re-entry detection module 320 performs the network re-entry to the LRLS network by initiating HO to the new target AA of the LRLS network from the VSAT network and enables the data-path and the link may be marked as connected, active and data-path enabled.

At step 612, if the CP of one of the uplink and the downlink is lesser than the ninth threshold value, the network re-entry detection module 320 does not detect the network re-entry and hence stays on the VSAT network.

In an embodiment, FIG. 8I below indicates the AWSNR values stored in the SNR uplink circular buffer and the SNR downlink circular buffer corresponding to the new target AA. The seventh threshold is set to 24 and the ninth threshold value is set to 80%.

As illustrated in FIG. 8I, the AWSNR values greater than the seventh threshold value of 24 is determined in the SNR uplink circular buffer and the SNR downlink circular buffer, by the data processing module 315. Further, the data processing module 315 determines the CP for the uplink and the downlink. CP for uplink and downlink is the percentage ratio of number of AWSNR values greater than the seventh threshold and total number of AWSNR values in the SNR uplink and downlink circular buffers respectively. For an instance, in the SNR downlink circular buffer four out of five AWSNR values are greater than the seventh threshold value. Therefore, the CP for the downlink is calculated as (4/5)*100=80%. Similarly, the CP for uplink is determined as 100%. The network re-entry module 320 compares the CP of the uplink and the downlink with the ninth threshold value. In the downlink, 80% of AWSNR values are greater than the seventh threshold value. The CP is greater than the confidence percentage for data-path enable (ninth threshold) and network re-entry is detected in the downlink. In the uplink, 100% of AWSNR values are greater than the AWSNR data-path enable threshold (seventh threshold). Further the CP for uplink is greater than the confidence percentage for data-path enable (ninth threshold) and network re-entry is detected in the uplink. As the cell edge is detected on both the uplink and the downlink, the network re-entry detection module 320 perform the inter-network HO to the new target AA of the LRLS network from the VSAT network.

In an embodiment steps 607 through steps 610 and step 611, step 612 indicates network re-entry based on MCS metrics. The steps 607 to 610 are executed if the target AA is determined using the MCS metrics.

At step 607, the MCS throughput retrieval module 314 retrieves MCS throughput values on the uplink and the downlink corresponding to the new target AA using the method disclosed in step 407. Further, the MCS throughput retrieval module 314 stores the MCS throughput values of the uplink and the downlink in the MCS uplink circular buffer and the MCS downlink circular buffer respectively.

At step 608, the data processing module 315 identifies the MCS throughput values greater than the eighth threshold value on the MCS uplink circular buffer and the MCS downlink circular buffer. The eighth threshold value may refer to the MCS throughput data-path enable threshold. The eighth threshold value indicates the MCS throughput value on the uplink and downlink which is at least 20 Mbps greater than the SLA requirement.

At step 609, the data processing module 315 determines CP for the MCS uplink circular buffer and the MCS downlink circular buffer. The CP for uplink and downlink is a percentage ratio of number of MCS throughput values identified in the step 608 and total number of MCS throughput values in the MCS uplink circular buffer and the MCS downlink circular buffers respectively.

At step 610, the network re-entry detection module 320 compares the CP of the uplink and the downlink with the tenth threshold value. The tenth threshold value may refer to the CP for performing network re-entry.

At step 611, if the CP of both the uplink and the downlink is greater than the tenth threshold value, the network re-entry detection module 320 detects the network re-entry on the new target AA and hence the Handover performing module 319 performs network re-entry to the new target AA of the LRLS network from the VSAT network by enabling the data-path and the link may be marked as connected, active and data-path enabled.

At step 612, if the CP of one of the uplink and the downlink is lesser than the tenth threshold value, the network re-entry detection module 320 does not detect the network re-entry on the new target AA and hence and hence stays on the VSAT network.

In an embodiment, FIG. 8J below indicates the MCS throughput values stored in the MCS uplink circular buffer and the MCS downlink circular buffer corresponding to the new target AA. The eighth threshold value is set to 24 Mbps and the tenth threshold value is set to 80%.

As illustrated in FIG. 8J, the MCS throughput values greater than the eighth threshold value of 24 Mbps is determined in the MCS uplink circular buffer and the MCS downlink circular buffer, by the data processing module 315. Further, the data processing module 315 determines the CP for the uplink and the downlink. CP for uplink and downlink is the percentage ratio of number of MCS throughput values greater than the eighth threshold and total number of MCS throughput values in the MCS uplink circular buffer and the MCS downlink circular buffers respectively. For an instance, in the MCS downlink circular buffer four out of five MCS throughput values are greater than the eighth threshold value. Therefore, the CP for the downlink is calculated as (4/5)*100=80%. Similarly, the CP for uplink is determined as 100%. The network re-entry detection module 320 compares the CP of the uplink and the downlink with the tenth threshold value. In the downlink, 80% of MCS throughput values are greater than the eighth threshold value. The CP is greater than the confidence percentage for data-path enable (eighth threshold) and network re-entry is detected in the downlink. In the uplink, 100% of MCS throughput values are greater than the MCS data-path enable threshold (tenth threshold). Further the CP for uplink is greater than the confidence percentage for data-path enable (eighth threshold) and network re-entry is detected in the uplink. As the network re-entry is detected on both the uplink and the downlink, the Handover performing module 319 perform the inter-network HO to the new target AA of the LRLS network from the VSAT network.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated method of FIG. 4, FIG. 5 and FIG. 6 shows certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

In an embodiment, the system and method as disclosed in the present disclosure, may be used in real-time for performing HO in a LRLS network.

In an embodiment, the system and method as disclosed in the present disclosure, tracks BTS AA through statistical processing of SNR values and MCS throughput values at the MAC layer avoiding the heavy maintenance of electromechanical motor rotation of CPE AAs or compute intensive signal processing techniques to position CPE AAs tracking the BTS.

In an embodiment, the system and method as disclosed in the present disclosure, jointly uses uplink and downlink metrics for a robust CPE based inter-AA HO where channel quality on either communication end points is factored in the HO decision.

In an embodiment, the system and method as disclosed in the present disclosure, minimizes flapping (network ping-pong) effect through a stringent qualification of target AA in both inter-AA HO and network re-entry.

In an embodiment, the system and method as disclosed in the present disclosure, avoids deep signal fading, narrow-band interference and noise spikes in the communication link between the BTS and the CPE.

In an embodiment, the system and method as disclosed in the present disclosure, optimizes throughput through inter-AA HOs and HOs to VSAT and vice versa.

In an embodiment, the system and method as disclosed in the present disclosure, tracks the BTS based on metrics such as MCS and SNR, the solution proposed can be ported to many different similar communication systems that provide a facility to fetch SNR or MCS from the hardware unit from a user application.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for performing Handover (HO) in a Long-Range Land-To-Sea (LRLS) wireless network, comprising:
   receiving, by a HO management system of a Customer Premise Equipment (CPE), one or more configuration parameters from the CPE, wherein the CPE comprises an active Antenna Array (AA) communicating with a Base Transceiver Station (BTS) and one or more inactive AAs;
   retrieving, by the HO management system, based on data traffic between the CPE and the BTS, at least one of, Signal to Noise Ratio (SNR) values on uplink and downlink corresponding to the active AA or at least one adjacent neighbor AA of the active AA, wherein the SNR values are retrieved by scanning at least one adjacent neighbor AA of the active AA based on the configuration parameters, wherein the at least one adjacent neighbor of the active AA corresponds to the one or more inactive AAs that are neighbors of the active AA, and
   Modulation and Coding Scheme (MCS) throughput values on the uplink and the downlink corresponding to the active AA and immediate neighbor AA pair of the active AA, wherein the MCS throughput values are retrieved by dwelling on each of the immediate neighbor AA pair of the active AA based on the configuration parameters, wherein the immediate neighbor AA pair of the $0^{th}$ AA among 'N' AA's is represented as N1 and N2 and wherein N1=(N+1) mod(N) and N2=(N−1) mod (N) wherein $0^{th}$ AA is the active AA with 'N' adjacent neighbors of the active AA;
   determining, by the HO management system, a target AA based on one of the SNR values or the MCS throughput values on the uplink and the downlink; and
   initiating, by the HO management system, a HO from active AA to the determined target AA, for performing an inter-AA HO.

2. The method as claimed in claim 1, wherein the active AA has a pre-defined signal link strength for communicating with the BTS and is in Line of Sight (LoS) with the BTS, and the inactive AAs are neighbors of the active AA.

3. The method as claimed in claim 1, wherein the one or more configuration parameters comprises AA periodic scan interval for retrieval of SNR values (TSS), AA periodic scan interval for retrieval of MCS throughput values (TSF), AA dwell time for retrieval of SNR values (TDS), AA dwell time for retrieval of MCS throughput values (TDF), SNR expiry time (TSNR), and MCS expiry time (TMCS).

4. The method as claimed in claim 1, wherein the CPE signals the BTS for entering a scanning mode.

5. The method as claimed in claim 1, wherein the at least one adjacent neighbor AA of the active AA is scanned for a pre-defined scan interval based on AA dwell time for retrieval of SNR values (TDS) for retrieving the SNR values and each of the at least one adjacent neighbor AA of the active AA is scanned using a pre-defined scan order.

6. The method as claimed in claim 5, wherein the SNR values are computed and retrieved based on a stats frame mechanism, wherein the CPE and the BTS alternate stats frames in the uplink and the downlink, and wherein each of the stats frames comprises a corresponding SNR value.

7. The method as claimed in claim 1, wherein processing the SNR values for determining the target AA comprises:
 storing, by the HO management system, the SNR values retrieved on the uplink and the downlink in SNR uplink circular buffers and SNR downlink circular buffers;
 determining, by the HO management system, a confidence percentage for each of the at least one adjacent neighbor AA of the active AA and the active AA based on the SNR uplink circular buffers and the SNR downlink circular buffers, wherein the confidence percentage indicates a percentage of highest SNR values obtained for the active AA and each of the at least one adjacent neighbor AA of the active AA; and
 comparing, by the HO management system, the confidence percentage of each of the at least one adjacent neighbor AA of the active AA and the active AA with a first threshold value, for determining the target AA.

8. The method as claimed in claim 7, wherein the SNR values in the SNR uplink circular buffers and the SNR downlink circular buffers are purged out after a period of SNR expiry time (TSNR).

9. The method as claimed in claim 1, wherein the MCS throughput values are retrieved by switching from the active AA to each of the immediate neighbor AA pair of the active AA for a pre-defined AA dwell time for retrieval of MCS throughput values (TDF).

10. The method as claimed in claim 1, wherein processing the MCS throughput values for determining the target AA comprises:
 storing, by the HO management system, the MCS throughput values retrieved on the uplink and the downlink in MCS uplink circular buffers and MCS downlink circular buffers;
 determining, by the HO management system, a confidence percentage for each of the immediate neighbor AA pair of the active AA and the active AA based on the MCS uplink circular buffers and the MCS downlink circular buffers, wherein the confidence percentage indicates a percentage of highest MCS throughput values obtained for each of the immediate neighbor AA pair of the active AA and the active AA; and
 comparing, by the HO management system, the confidence percentage of each of the immediate neighbor AA pair of the active AA and the active AA with a second threshold value, for determining the target AA.

11. The method as claimed in claim 10, wherein the MCS throughput values in the MCS uplink circular buffers and the MCS downlink circular buffers are purged out after a period of MCS expiry time (TMCS).

12. A method for performing Handover (HO) in a Long-Range Land-To-Sea (LRLS) wireless network, comprising:
 retrieving, by a HO management system, one of SNR values or MCS throughput values on uplink and downlink corresponding to a target Antenna Array (AA) based on data traffic between a Customer Premise Equipment (CPE) and a Base Transceiver Station (BTS);
 storing, by the HO management system, the SNR values retrieved on the uplink and the downlink in SNR uplink circular buffers and SNR downlink circular buffers and the MCS throughput values retrieved on the uplink and the downlink in MCS uplink circular buffers and the MCS downlink circular buffers, wherein each of the SNR values are subjected to weighting to obtain corresponding Aggregate Weighted SNR (AWSNR) values;
 identifying, by the HO management system, one of:
  AWSNR values less than a AWSNR data-path disable threshold value on the SNR uplink circular buffers and the SNR downlink circular buffers wherein the AWSNR data-path disable threshold value is the value of AWSNR present on the uplink and the downlink which could sustain Service Level Agreement requirement (SLA); or
  the MCS throughput values less than a MCS throughput data-path disable threshold value on the MCS uplink circular buffers and the MCS downlink circular buffers wherein the MCS throughput data-path disable threshold value is the value of MCS throughput in the uplink and downlink required to sustain the SLA;
 determining, by the HO management system, one of:
  a confidence percentage for the uplink and the downlink based on the identification of the AWSNR values, wherein the confidence percentage is a percentage ratio of number of AWSNR values identified and total number of the AWSNR values in the SNR uplink circular buffers and the SNR downlink circular buffers; or
  a confidence percentage for the uplink and the downlink based on the identification of the MCS throughput values, wherein the confidence percentage is a percentage ratio of number of the MCS throughput values identified and total number of the MCS throughput values in the MCS uplink circular buffers and the MCS downlink circular buffers; and
 performing, by the HO management system, HO to Very Small Aperture Terminal (VSAT) network from the target AA, when the confidence percentage of one of the uplink and the downlink determined based on the AWSNR values or the MCS throughput values is greater than one or more threshold value of the confidence percentage for data-path disable.

13. The method as claimed in 12, further comprising:
retrieving, by the HO management system of CPE, one of SNR values or MCS throughput values on the uplink and the downlink corresponding to a new target AA determined by the CPE after HO to VSAT has been performed, wherein each of the SNR values are subjected to weighting to obtain corresponding AWSNR values;
storing, by the HO management system of CPE, the SNR values retrieved on the uplink and the downlink in the SNR uplink circular buffers and the SNR downlink circular buffers and the MCS throughput values retrieved on the uplink and the downlink in the MCS uplink circular buffers and the MCS downlink circular buffers;
identifying, by the HO management system, one of:

the AWSNR values greater than and equal to a threshold value indicating AWSNR data-path enable threshold on the SNR uplink circular buffers and the SNR downlink circular buffers; or the MCS throughput values greater than and equal to threshold value indicating MCS throughput data-path enable on the MCS uplink and downlink circular buffers;

determining, by the HO management system, one of:
  a confidence percentage for the uplink and the downlink based on the identification of the AWSNR values, wherein the confidence percentage is a percentage ratio of number of AWSNR values identified and total number of AWSNR values in the SNR uplink circular buffers and the SNR downlink circular buffers; or
  a confidence percentage for the uplink and the downlink based on the identification of the MCS throughput values, wherein the confidence percentage is a percentage ratio of number of MCS throughput values identified and total number of MCS throughput values in the MCS uplink circular buffers and the MCS downlink circular buffers; and performing, by the HO management system, a network re-entry to the LRLS network by initiating HO to the new target AA of the LRLS network from the VSAT network, if the confidence percentage on both the uplink and the downlink determined based on the AWSNR values and the MCS throughput values is greater than one or more threshold value indicating confidence percentage for performing network re-entry.

14. A Handover (HO) management system of a Customer Premise Equipment (CPE) for performing HO in a Long-Range Land-To-Sea (LRLS) wireless network, the HO management system comprising:
  a processor; and
  a memory, communicatively coupled with the processor, storing processor executable instructions, which, on execution causes the processor to:
    receive, one or more configuration parameters from the CPE, wherein the CPE comprises an active Antenna Array (AA) communicating with a Base Transceiver Station (BTS) and one or more inactive AAs;
    retrieve, based on data traffic between the CPE and the BTS, at least one of,
    Signal to Noise Ratio (SNR) values on uplink and downlink corresponding to the active AA and at least one adjacent neighbor AA of the active AA, wherein the SNR values are retrieved by scanning at least one adjacent neighbor AA of the active AA based on the configuration parameters, wherein the at least one adjacent neighbor of the active AA corresponds to the one or more inactive AAs that are neighbors of the active AA, or
    Modulation and Coding Scheme (MCS) throughput values on the uplink and the downlink corresponding to the active AA and immediate neighbor AA pair of the active AA, wherein the MCS throughput values are retrieved by dwelling on each of the immediate neighbor AA pair of the active AA based on the configuration parameters wherein the immediate neighbor AA pair of the $0^{th}$ AA among 'N' AA's is represented as N1 and N2 and wherein N1=(N+1) mod(N) and N2=(N−1) mod (N) wherein $0^{th}$ AA is the active AA with 'N' adjacent neighbors of the active AA;
    determine, a target AA based on one of the SNR values or the MCS throughput values on the uplink and the downlink; and
    initiate, a HO from active AA to the determined target AA, for performing an inter-AA HO.

15. The HO management system as claimed in claim 14, wherein the active AA has a pre-defined signal link strength for communicating with the BTS and is in Line of Sight (LoS) with the BTS, and the inactive AAs are neighbors of the active AA.

16. The HO management system as claimed in claim 14, wherein the one or more configuration parameters comprises AA periodic scan interval for retrieval of SNR values (TSS), AA periodic scan interval for retrieval of MCS throughput values (TSF), AA dwell time for retrieval of SNR values (TDS), AA dwell time for retrieval of MCS throughput values (TDF), SNR expiry time (TSNR), and MCS expiry time (TMCS).

17. The HO management system as claimed in claim 14, wherein the CPE signals the BTS for entering a scanning mode.

18. The HO management system as claimed in claim 14, wherein the at least one adjacent neighbor AA of the active AA is scanned for a pre-defined scan interval based on AA dwell time for retrieval of SNR values (TDS) for retrieving the SNR values and each of the at least one adjacent neighbor AA of the active AA is scanned using a pre-defined scan order.

19. The HO management system as claimed in claim 18, wherein the SNR values are computed and retrieved based on a stats frame mechanism, wherein the CPE and the BTS alternate stats frames in the uplink and the downlink, and wherein each of the stats frames comprises a corresponding SNR value.

20. The HO management system as claimed in claim 14, wherein processing of the SNR values for determining the target AA comprises:
  storing, the SNR values retrieved on the uplink and the downlink in SNR uplink circular buffers and SNR downlink circular buffers;
  determining, a confidence percentage for each of the at least one adjacent neighbor AA of the active AA and the active AA based on the SNR uplink circular buffers and the SNR downlink circular buffers, wherein the confidence percentage indicates a percentage of highest SNR values obtained for the active AA and each of the at least one adjacent neighbor AA of the active AA; and
  comparing, the confidence percentage of each of the at least one adjacent neighbor AA of the active AA and the active AA with a first threshold value, for determining the target AA.

21. The HO management system as claimed in claim 20, wherein the SNR values in the SNR uplink circular buffers and the SNR downlink circular buffers are purged out after a period of SNR expiry time (TSNR).

22. The HO management system as claimed in claim 14, wherein the MCS throughput values are retrieved by switching from the active AA to each of the immediate neighbor AA pair of the active AA for a pre-defined AA dwell time for retrieval of MCS throughput values (TDF).

23. The HO management system as claimed in claim 14, wherein processing of the MCS throughput values for determining the target AA comprises:

storing the MCS throughput values retrieved on the uplink and the downlink in MCS uplink circular buffers and MCS downlink circular buffers;

determining a confidence percentage for each of the immediate neighbor AA pair of the active AA and the active AA based on the MCS uplink circular buffers and the MCS downlink circular buffers, wherein the confidence percentage indicates a percentage of highest MCS throughput values obtained for each of the immediate neighbor AA pair of the active AA and the active AA; and comparing the confidence percentage of each of the immediate neighbor AA pair of the active AA and the active AA with a second threshold value, for determining the target AA.

24. The HO management system as claimed in claim 23, wherein the MCS throughput values in the MCS uplink circular buffers and the MCS downlink circular buffers are purged out after a period of MCS expiry time (TMCS).

25. A Handover (HO) management system of a Customer Premise Equipment (CPE) for performing HO in a Long-Range Land-To-Sea (LRLS) wireless network, the HO management system comprising:

a processor; and a memory, communicatively coupled with the processor, storing processor executable instructions, which, on execution causes the processor to:

retrieve, one of SNR values or MCS throughput values on uplink and downlink corresponding to a target Antenna Array (AA) based on data traffic between a Customer Premise Equipment (CPE) and a Base Transceiver Station (BTS);

storing the SNR values retrieved on the uplink and the downlink in SNR uplink circular buffers and SNR downlink circular buffers and the MCS throughput values retrieved on the uplink and the downlink in MCS uplink circular buffers and the MCS downlink circular buffers, wherein each of the SNR values are subjected to weighting to obtain corresponding Aggregate Weighted SNR (AWSNR) values;

identify, one of:

AWSNR values less than a AWSNR data-path disable threshold value on the SNR uplink circular buffers and the SNR downlink circular buffers wherein the AWSNR data-path disable threshold value is the value of AWSNR present on the uplink and the downlink which could sustain Service Level Agreement (SLA) requirement; or the MCS throughput values less than a MCS throughput data-path disable threshold value on the MCS uplink circular buffers and the MCS downlink circular buffers wherein the MCS throughput data-path disable threshold value is the value of MCS throughput in the uplink and downlink required to sustain the SLA;

determine, one of:

a confidence percentage for the uplink and the downlink based on the identification of the AWSNR values, wherein the confidence percentage is a percentage ratio of number of AWSNR values identified and total number of the AWSNR values in the SNR uplink circular buffers and the SNR downlink circular buffers; or a confidence percentage for the uplink and the downlink based on the identification of the MCS throughput values, wherein the confidence percentage is a percentage ratio of number of the MCS throughput values identified and total number of the MCS throughput values in the MCS uplink circular buffers and the MCS downlink circular buffers; or perform, HO to Very Small Aperture Terminal (VSAT) network from the target AA, when the confidence percentage of one of the uplink or the downlink determined based on the AWSNR values or the MCS throughput values is greater than one or more threshold value of the confidence percentage for data-path disable.

26. The HO management system as claimed in claim 25, wherein performing HO in LRLS network further comprises:

retrieving, one of SNR values or MCS throughput values on the uplink and the downlink corresponding to a new target AA determined by the CPE after HO to VSAT has been performed, wherein each of the SNR values are subjected to weighting to obtain corresponding AWSNR values;

storing the SNR values retrieved on the uplink and the downlink in the SNR uplink circular buffers and the SNR downlink circular buffers and the MCS throughput values retrieved on the uplink and the downlink in the MCS uplink circular buffers and the MCS downlink circular buffers;

identifying, one of:

the AWSNR values greater than and equal to a threshold value indicating AWSNR data-path enable on the SNR uplink circular buffers and the SNR downlink circular buffers; or the MCS throughput values greater than and equal to threshold value indicating MCS throughput data-path enable on the MCS uplink and downlink circular buffers; determining, one of:

a confidence percentage for the uplink and the downlink based on the identification of the AWSNR values, wherein the confidence percentage is a percentage ratio of number of AWSNR values identified and total number of AWSNR values in the SNR uplink circular buffers and the SNR downlink circular buffers; or a confidence percentage for the uplink and the downlink based on the identification of the MCS throughput values, wherein the confidence percentage is a percentage ratio of number of MCS throughput values identified and total number of MCS throughput values in the MCS uplink circular buffers and the MCS downlink circular buffers; and performing, a network re-entry to the LRLS network by initiating HO to the new target AA of the LRLS network from the VSAT network, if the confidence percentage on both the uplink and the downlink determined based on the AWSNR values and the MCS throughput values is greater than a one or more threshold value indicating confidence percentage for performing network re-entry.

* * * * *